US012135001B2

(12) United States Patent
Itaya et al.

(10) Patent No.: US 12,135,001 B2
(45) Date of Patent: Nov. 5, 2024

(54) FUEL INJECTION VALVE

(71) Applicant: Hitachi Astemo, Ltd., Hitachinaka (JP)

(72) Inventors: Takaki Itaya, Hitachinaka (JP); Noriyuki Maekawa, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 711 days.

(21) Appl. No.: 17/286,097

(22) PCT Filed: Oct. 4, 2019

(86) PCT No.: PCT/JP2019/039245
§ 371 (c)(1),
(2) Date: Apr. 16, 2021

(87) PCT Pub. No.: WO2020/085039
PCT Pub. Date: Apr. 30, 2020

(65) Prior Publication Data

US 2021/0381479 A1 Dec. 9, 2021

(30) Foreign Application Priority Data

Oct. 26, 2018 (JP) ................................ 2018-201665

(51) Int. Cl.
*F02M 61/18* (2006.01)
*F02M 63/00* (2006.01)

(52) U.S. Cl.
CPC .... *F02M 61/1806* (2013.01); *F02M 61/1846* (2013.01); *F02M 63/0077* (2013.01)

(58) Field of Classification Search
CPC .......... F02M 61/1846; F02M 61/1806; F02M 61/1833; F02M 63/0077
See application file for complete search history.

(56) References Cited

U.S. PATENT DOCUMENTS 5,934,571 A * 8/1999 Schmidt .............. F02M 45/083 239/533.9
6,644,565 B2 * 11/2003 Hockenberger ... F02M 61/1833 239/533.2
(Continued)

FOREIGN PATENT DOCUMENTS

JP 10-9095 A 1/1998
JP 2008-68360 A 3/2008
(Continued)

OTHER PUBLICATIONS

Partial Supplementary European Search Report issued in European Application No. 19875229.7 dated Apr. 8, 2022 (12 pages).
(Continued)

*Primary Examiner* — Joseph A Greenlund
(74) *Attorney, Agent, or Firm* — Crowell & Moring LLP

(57) ABSTRACT

An object of the present invention is to provide a fuel injection valve capable of suppressing fuel adhesion to a nozzle surface. Therefore, an injection hole 107 has a curved surface portion 107E formed between a peripheral edge 107I of an inlet opening 107G and an inner peripheral surface 107F. The curved surface portion 107E has a center-side curved surface portion 107AE and an outer-peripheral-side curved surface portion 107BE. The center-side curved surface portion 107AE is formed to have a width W107AE that is larger than the width W107BE of the outer-peripheral-side curved surface portion 107BE.

12 Claims, 13 Drawing Sheets

(56) References Cited

U.S. PATENT DOCUMENTS

| | | | | |
|---|---|---|---|---|
| 8,136,745 | B2 * | 3/2012 | Kaneko | F02M 61/1833 239/533.2 |
| 8,544,770 | B2 * | 10/2013 | Limmer | F02M 61/1806 239/584 |
| 9,511,389 | B2 * | 12/2016 | Teng | F02M 61/1806 |
| 9,657,701 | B2 * | 5/2017 | Kato | F02M 61/1846 |
| 10,704,518 | B2 * | 7/2020 | Yasukawa | F02M 61/1833 |
| 11,098,686 | B2 * | 8/2021 | Itaya | F02M 51/061 |
| 2008/0067268 | A1 * | 3/2008 | Kaneko | F02M 61/1833 29/890.142 |
| 2009/0025680 | A1 * | 1/2009 | Kihara | F02M 61/1813 123/299 |
| 2009/0294416 | A1 * | 12/2009 | Hu | B23K 26/03 219/121.72 |
| 2013/0270369 | A1 * | 10/2013 | Peters | F02M 61/10 239/533.2 |
| 2015/0209806 | A1 * | 7/2015 | Teng | B05B 1/02 239/548 |
| 2015/0211460 | A1 * | 7/2015 | Hijima | F02M 61/10 239/584 |
| 2015/0377200 | A1 * | 12/2015 | Abe | F02M 61/1813 239/562 |
| 2018/0180009 | A1 * | 6/2018 | Sano | F02M 61/1893 |
| 2018/0363615 | A1 * | 12/2018 | Yasukawa | F02M 51/0671 |
| 2019/0003438 | A1 * | 1/2019 | Ginter | F02M 61/1833 |
| 2019/0093617 | A1 * | 3/2019 | Niwa | F02M 61/184 |
| 2019/0309720 | A1 * | 10/2019 | Schmieder | F02M 61/1806 |
| 2019/0338740 | A1 * | 11/2019 | Ogura | F02M 61/1813 |

FOREIGN PATENT DOCUMENTS

| | | | |
|---|---|---|---|
| JP | 2010-180763 | A | 8/2010 |
| JP | 2015-140753 | A | 8/2015 |
| JP | 2016-3628 | A | 1/2016 |
| WO | WO 2006/053811 | A1 | 5/2006 |
| WO | WO 2013/145451 | A1 | 10/2013 |

OTHER PUBLICATIONS

International Search Report (PCT/ISA/210) issued in PCT Application No. PCT/JP2019/039245 dated Jan. 21, 2020 with English translation (five (5) pages).

Japanese-language Written Opinion (PCT/ISA/237) issued in PCT Application No. PCT/JP2019/039245 dated Jan. 21, 2020 (four (4) pages).

* cited by examiner

FUEL INJECTION VALVE

TECHNICAL FIELD

The present invention relates to a fuel injection valve.

BACKGROUND ART

A fuel injection nozzle in JP 2008-68360 A (PTL 1) is known. PTL 1 discloses a technique as follows: in order to reduce cavitation erosion, a curvature is provided on the entire periphery of an inlet peripheral edge of an injection hole in a manner that the abrasive grain fluid is caused to flow from the rear end of a nozzle body into the injection hole through an internal space of the nozzle body, specifically, a space interposed between a seat surface and an outer surface of a processing insertion tool. PTL 1 discloses that the upstream edge of the inlet peripheral edge of the injection hole has a larger curvature than the curvature of the other peripheral edges (paragraphs [0050] and [0055]). However, in the paragraph [0055] of PTL 1, the followings are considered. Since the upstream edge of the inlet peripheral edge of the injection hole is chamfered intensively, the curvature of the upstream edge of the inlet peripheral edge of the injection hole is smaller than the curvature of the other peripheral edges, and the curvature radius of the upstream edge is larger than the curvature radius of the other peripheral edges.

Further, a fuel injection valve in JP 2016-3628 A (PTL 2) is known. In the fuel injection valve in PTL 2, the minimum curvature radius of the axial-side edge of the inlet peripheral edge of the injection hole is larger than the minimum curvature radius of the valve-seat-side edge, and the valve-seat-side edge is formed as a sharp edge (paragraph [0024]). That is, in the fuel injection valve in PTL 2, the fuel is atomized by separating the fuel flow at the sharp valve-seat-side edge to promote the occurrence of cavitation (paragraph 0031). Meanwhile, the rounded axial-side edge makes it easier for the fuel that stagnates on the axial side (fuel stagnant space when the valve is fully opened) when the needle (valve body) is fully opened to flow into the injection hole just before the needle is closed (paragraph [0031]).

CITATION LIST

Patent Literature

PTL 1: JP 2008-68360 A
PTL 2: JP 2016-3628 A

SUMMARY OF INVENTION

Technical Problem

As in PTL 2, sharpening the edge of the inlet of the injection hole to form a sharp edge promotes separation of the fuel flow at the sharp valve-seat-side edge of the injection hole. In this case, since the fuel flow flowing into the injection hole is disturbed, the fuel flow has a velocity component in a direction perpendicular to the axial direction (center axis direction) of the injection hole. When the velocity component in the direction perpendicular to the axial direction of the injection hole increases, the fuel flow spreads around the outlet of the injection hole, and fuel adhesion is likely to occur on the surface of the nozzle.

Meanwhile, when only the curvature is provided on the peripheral edge of the inlet of the injection hole, it is not possible to maintain the balance of the fuel flow velocity on the entire periphery of the injection hole, and the fuel flow is separated from the injection-hole inner peripheral surface in the injection hole. Thus, the pressure in the injection hole decreases, and cavitation (decompression boiling) is likely to occur. When the cavitation occurs, the fuel flow has the velocity component in the direction perpendicular to the axial direction of the injection hole. Thus, the fuel flow spreads around the outlet of the injection hole, and the fuel adhesion is likely to occur on the surface of the nozzle.

The fuel adherence occurs on the surface of the nozzle, and an over-rich mixture is formed around the adhered fuel. It is known that particulate matters are generated by burning the over-rich mixture.

An object of the present invention is to provide a fuel injection valve capable of suppressing fuel adhesion to a nozzle surface.

Solution to Problem

In order to solve the above problems, according to the present invention, a fuel injection valve includes a seat portion on which a valve body abuts, an injection hole having an inlet opening on a downstream side of the seat portion, and an injection-hole forming member in which the inlet opening is formed, wherein the injection hole has an inner peripheral surface extending from an inlet side to an outlet side and a curved surface portion formed between a peripheral edge of the inlet opening and the inner peripheral surface, on a plan view obtained by projecting the inner peripheral surface of the injection hole, the peripheral edge of the inlet opening, and an injection-hole center axis being a center axis of the injection hole, onto a virtual plane perpendicular to the injection-hole center axis, the curved surface portion has a center-side curved surface portion and an outer-peripheral-side curved surface portion, the center-side curved surface portion is a curved surface portion formed on an inner side of a center-side peripheral edge portion in a radial direction about an injection-valve center axis being a center axis of the fuel injection valve, in the peripheral edge of the inlet opening, and the outer-peripheral-side curved surface portion is a curved surface portion formed on an inner side of an outer-peripheral-side peripheral edge portion in the radial direction about the injection-valve center axis, in the peripheral edge of the inlet opening, and a width at the center-side curved surface portion is configured to be larger than a width at the outer peripheral-side curved surface portion.

According to the present invention, a fuel injection valve includes a seat portion on which a valve body abuts, an injection hole having an inlet opening on a downstream side of the seat portion, and an injection-hole forming member in which the inlet opening is formed, wherein the injection hole has an inner peripheral surface extending from an inlet side to an outlet side and a curved surface portion formed between a peripheral edge of the inlet opening and the inner peripheral surface, in a cross section that includes an injection-hole center axis being a center axis of the injection hole and pass through a center-side peripheral edge portion and an outer-peripheral-side peripheral edge portion in a radial direction about an injection-valve center axis being a center axis of the injection valve, in the peripheral edge of the inlet opening, the curved surface portion has a center-side curved surface portion formed on an inner side of the center-side peripheral edge portion and an outer-peripheral-side curved surface portion formed on an inner side of the outer-peripheral-side peripheral edge portion, and further the curved surface portion is configured so that an area of a portion surrounded by the center-side curved surface portion, an extension line of an inner peripheral surface portion connected to the center-side curved surface portion in the inner peripheral surface, and a straight line connecting the center-side peripheral edge portion and the outer-peripheral-side peripheral edge portion is larger than an area of a portion surrounded by the outer-peripheral-side curved surface portion, an extension line of an inner peripheral surface portion connected to the outer-peripheral-side curved surface portion in the inner peripheral surface, and the straight line connecting the center-side peripheral edge portion and the outer-peripheral-side peripheral edge portion.

According to the present invention, a fuel injection valve includes a seat portion on which a valve body abuts, an injection hole having an inlet opening on a downstream side of the seat portion, and an injection-hole forming member in which the inlet opening is formed, wherein the injection hole has an inner peripheral surface extending from an inlet side to an outlet side and a curved surface portion formed between a peripheral edge of the inlet opening and the inner peripheral surface, in a cross section that includes an injection-hole center axis being a center axis of the injection hole and pass through a center-side peripheral edge portion and an outer-peripheral-side peripheral edge portion in a radial direction about an injection-valve center axis being a center axis of the injection valve, in the peripheral edge of the inlet opening, the curved surface portion has a center-side curved surface portion formed on an inner side of the center-side peripheral edge portion and an outer-peripheral-side curved surface portion formed on an inner side of the outer-peripheral-side peripheral edge portion, and further the curved surface portion is configured so that a length of a curve connecting the center-side peripheral edge portion and an upstream side end portion of an inner peripheral surface portion connected to the center-side curved surface portion in the inner peripheral surface is longer than a length of a curve connecting the outer-peripheral-side peripheral edge portion and an upstream side end portion of an inner peripheral surface portion connected to the outer-peripheral-side curved surface portion in the inner peripheral surface.

Advantageous Effects of Invention

According to the fuel injection valve of the present invention, it is possible to provide a fuel injection valve capable of reducing fuel adhesion to a nozzle surface around an injection hole outlet.

In addition, issues, configurations and effects other than those described above will be described in detail in the following embodiments.

DESCRIPTION OF EMBODIMENTS

Hereinafter, embodiments of a fuel injection valve according to the present invention will be described in detail with reference to the drawings.

First Embodiment

A first embodiment of the present invention will be described with reference to FIGS. 1 to 9.

Figure 1:
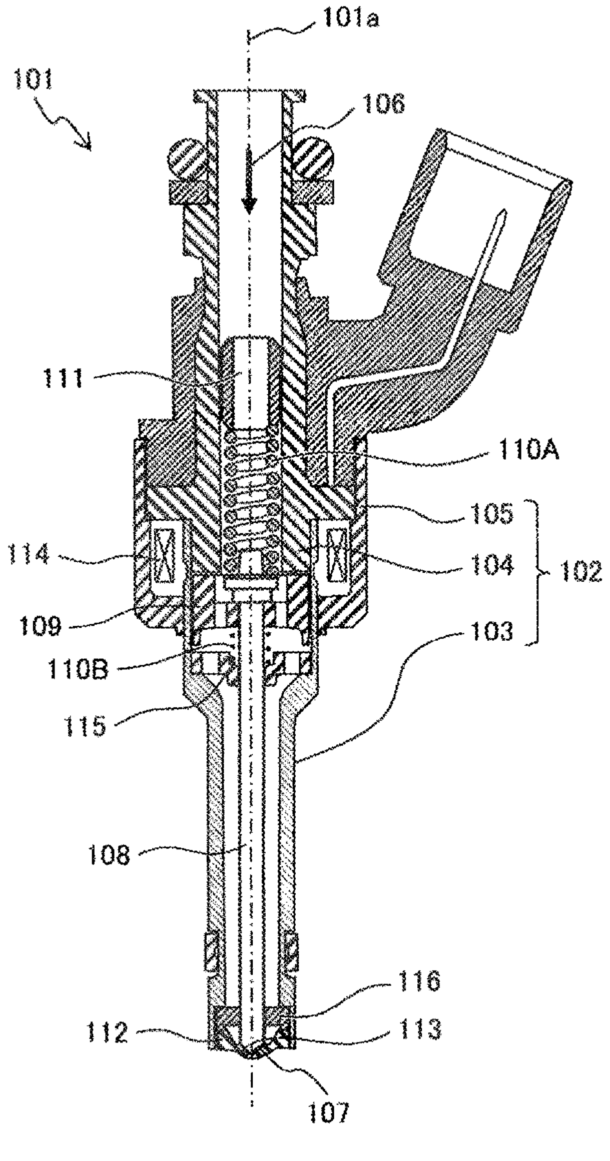
FIG. 1 is a configuration diagram illustrating a fuel injection valve according to an embodiment of the present invention.

The detailed configuration of a fuel injection valve in the present embodiment will be described with reference to FIG. 1. FIG. 1 is a configuration diagram illustrating a fuel injection valve according to an embodiment of the present invention. Note that, the fuel injection valve used in the description is an example, and the fuel injection valve to which the present invention can be applied is not limited to the configuration illustrated in FIG. 1.

In the following description, description will be made on the assumption that a direction along the center axis (injection-valve center axis) 101*a* of a fuel injection valve 101 is referred to as an axial direction. Description will be made on the assumption that, in the axial direction of the fuel injection valve, an end portion on a side on which an injection hole 107 is provided is referred to as a tip portion, and an end portion on the opposite side of the tip portion is referred to as a base end portion. Further, with a certain member or position as a reference, the side of the tip portion may be referred to as a tip side, and the side of the base end portion may be referred to as a base end side. Further, in the description, description may be made by designating the vertical direction, for example, "upper end" and "lower end", but the vertical direction in this case is set based on the drawing, and does not specify the vertical direction in the mounted state of the fuel injection valve.

In the fuel injection valve 101, a fuel-injection-valve main body 102 is configured by a nozzle holder 103, a fixed core 104, and a housing 105. Fuel from a high-pressure fuel pump (not illustrated) is discharged from a plurality of injection holes 107 through a fuel passage 106. The plurality of injection holes 107 are formed in an injection-hole forming member 112 attached to the tip portion of the nozzle holder 103.

The valve body 108 is assembled to an anchor (movable core) 109 and is stored in the nozzle holder 103 to be movable in the axial direction together with the anchor 109.

In the present embodiment, the valve body 108 and the anchor 109 are configured to be relatively displaceable in the axial direction, but both may be fixed.

A spring (first spring) 110A is disposed between the valve body 108 and an adjuster pin 111. The position of the upper end portion of the spring 110A is constrained by the adjuster pin 111. When the spring 110A urges the valve body 108 toward the tip side (valve closing direction) and pressing the valve body on the seat portion 113 of the injection-hole forming member 112, the fuel injection valve 101 is closed. Further, in the present embodiment, since the valve body 108 and the anchor 109 are configured to be relatively displaceable in the axial direction, a second spring 110B for urging the anchor 109 toward the base end side (valve opening direction) is provided.

Note that, the injection-hole forming member 112 is configured as a member for forming a seat portion 113 in addition to the injection hole 107. The injection hole 107 opens in the inner surface of the injection-hole forming member 112. The inner surface of the injection-hole forming member 112 is usually configured by a conical surface (truncated cone surface). The conical surface is a surface on which the seat portion 113 is formed, and may be referred to as a seat-portion forming surface.

A solenoid 114 is disposed radially outward of the anchor 109 and the fixed core 104.

When the solenoid 114 is energized, a drive current from a drive circuit (not illustrated) flows in the solenoid 114. Thus, the fixed core 104 is excited, and thus a magnetic attraction force on the anchor 109 is generated, and the anchor 109 is pulled up in the axial direction. Along with this, the valve body 108 is pulled up in the axial direction by the anchor 109, and the valve body 108 is separated from the seat portion 113. When the valve body 108 is separated from the seat portion 113, a fuel passage is formed between the valve body 108 and the seat portion 113, and the fuel injection valve 101 is opened. At this time, guides 115 and 116 guide the axial movement of the valve body 108.

When the fuel passage is formed between the valve body 108 and the seat portion 113, fuel pressurized and pumped by the high-pressure fuel pump (not illustrated) is injected to the outside of the fuel injection valve 101 through a plurality of fuel injection holes 107.

Figure 2:
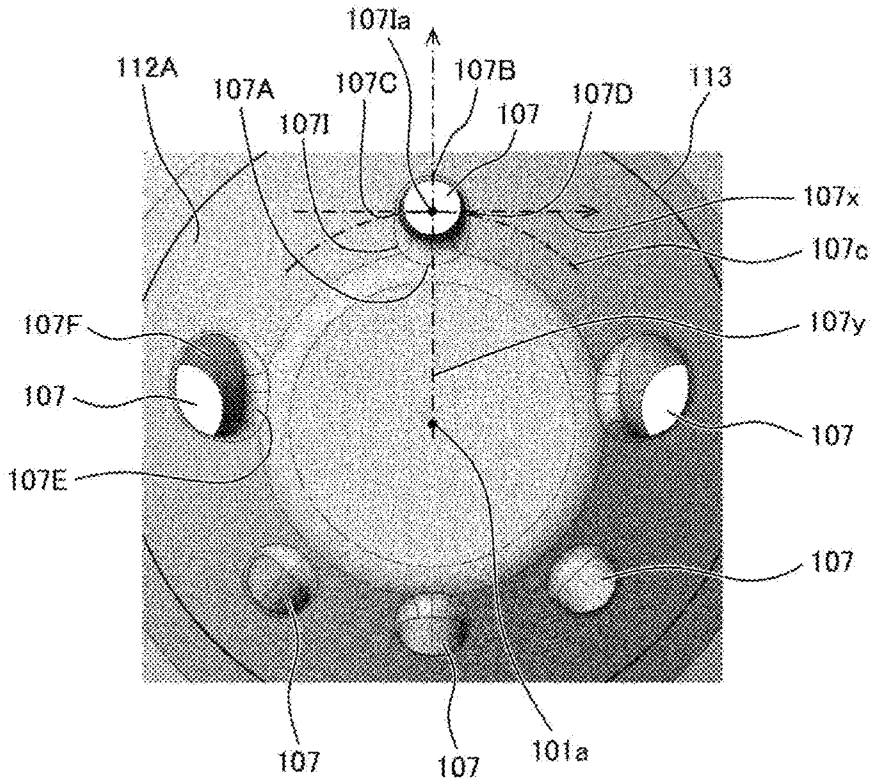
FIG. 2 is a plan view illustrating a configuration of an injection hole in a first embodiment.

FIG. 2 is a diagram for explaining the structure of the injection hole 107 to which the present invention is applied, and is a diagram when the injection-hole forming member 112 is viewed from above (base end side) of FIG. 1 in the axial direction. Note that FIG. 2 is a plan view in which the injection-hole forming member 112 and the injection hole 107 are projected onto a plane perpendicular to the center axis 101*a*.

Regarding the peripheral edge of an inlet of the injection hole 107 (inlet opening peripheral edge) 107I, 107A represents the peripheral edge portion (center-side peripheral edge portion) of the fuel injection valve 101 on the center axis 101*a* side (radial center side or sack side). 107B represents the peripheral edge portion (outer-peripheral-side peripheral edge portion) on the seat portion 113 side (radial outer peripheral side). 107C and 107D represent the peripheral edge portions in a lateral direction of the inlet opening peripheral edge 107I of the injection hole 107.

In the present embodiment, each of the nozzle holder 103 and the fixed core 104 has a cylindrical portion. The center axis 101*a* of the fuel injection valve 101 coincides with the center axis of the cylindrical portion of the nozzle holder 103 and the fixed core 104. Further, the valve body 108 has a columnar rod portion. The center axis of the rod portion of the valve body 108 is disposed to coincide with the center axis 101*a* of the fuel injection valve 101.

An x-axis 107*x* and a y-axis 107*y* that are perpendicular to each other are defined on the plan view of FIG. 2. The y-axis 107*y* is an axis that intersects with the center axis 101*a* and the center axis 107*a* of the injection hole 107 and extends in a radial direction. 107Ia indicates an intersection where the center axis 107*a* of the injection hole 107 intersects with an inlet opening surface (surface surrounded by the inlet opening peripheral edge 107I) of the injection hole 107. Thus, the y-axis 107*y* passes through the intersection 107Ia. The x-axis 107*x* is an axis that passes through the intersection 107Ia and is perpendicular to the y-axis 107*y*.

107*c* indicates a circle centered on the center axis 101*a*. The circuit is a reference circle for arranging the inlet opening of the injection hole 107, and is referred to as an arrangement circle of the injection hole 107. In the present embodiment, each injection hole 107 is disposed so that the center axis 107*a* of the injection hole 107 intersects with the arrangement circle 107*c*.

The lateral direction of the inlet opening peripheral edge 107I of the injection hole 107 represents a direction along the x-axis 107*x* in FIG. 2. The peripheral edge portions 107C and 107D in the lateral direction are portions of the inlet opening peripheral edge 107I with which the x-axis 107*x* intersects, and are formed between the peripheral edge portion 107A on the radial center side and the peripheral edge portion 107B on the radial outer peripheral side in a peripheral direction of the inlet opening peripheral edge 107I. The x-axis 107*x* and a circumference 107*c* intersect with the inlet opening peripheral edge 107I in the vicinity.

Therefore, the peripheral edge portions 107C and 107D in the lateral direction can also be portions of the inlet opening peripheral edge 107I with which the circumference 107*c* intersects. Thus, the peripheral edge portions 107C and 107D in the lateral direction may be referred to as peripheral-direction peripheral edge portions of the inlet opening peripheral edge 107I. The peripheral-direction peripheral edge portions 107C and 107D are located to face each other in a circumferential direction of the arrangement circle 107*c* or in the x-axis 107*x* direction.

A curved surface portion 107E is formed on the inlet opening peripheral edge 107I (107A to 107D) of the injection hole 107 over the entire periphery of the inlet opening peripheral edge 107I of the injection hole 107. It is desirable that the inlet opening peripheral edge 107I of each injection hole 107 is smoothly connected with a curvature so as to be rounded from the inlet of the injection hole 107 toward the outlet side over the entire periphery. The curvature forms a rounded portion (curvature forming portion) 107E connecting the inner peripheral surface 107F of the injection hole 107 and the conical surface (seat-portion forming surface) 112A.

Figure 3:
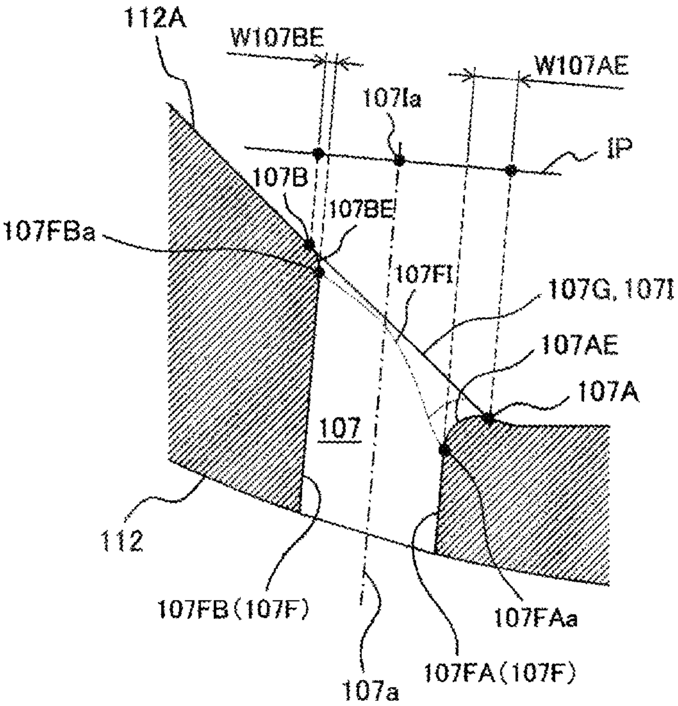
FIG. 3 is a cross-sectional view illustrating a portion of a cross section that is parallel to a center axis of the injection hole and includes the center axis in an embodiment of an injection-hole forming member according to the present invention.
Figure 4:
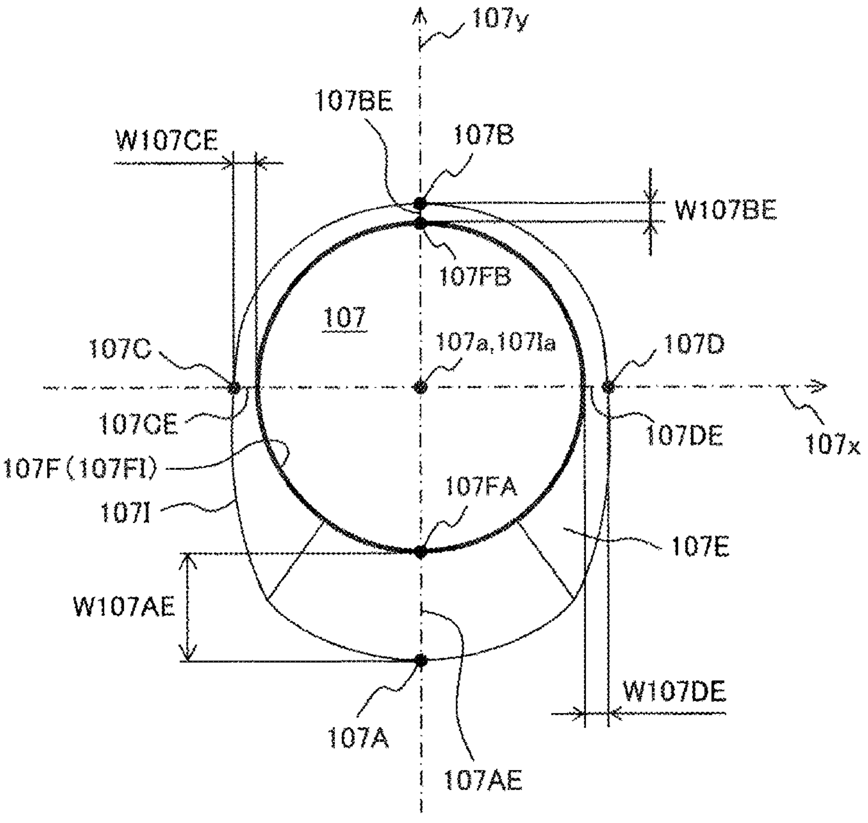
FIG. 4 is a plan view of a projection of the injection hole onto a virtual plane perpendicular to the center axis of the injection hole in the embodiment of the injection hole according to the present invention.

The configuration of the injection hole will be described in more detail with reference to FIGS. 3 to 5. FIG. 3 is a cross-sectional view illustrating a portion of a cross section that is parallel to the center axis 107*a* of the injection hole 107 and passes through the center axis 107*a* in the injection-hole forming member 112 according to the present embodiment. FIG. 4 is a plan view of a projection of the injection hole 107 onto a virtual plane IP (see FIG. 3) perpendicular to the center axis 107*a* regarding the injection hole 107 according to the present embodiment.

The injection hole 107 has the inner peripheral surface 107F and the curved surface portion 107E formed between the end portion 107FI of the inner peripheral surface 107F on the inlet side and the inlet opening peripheral edge 107I (on the inner side of the inlet opening peripheral edge 107I). The inner peripheral surface 107F extends in the direction along the center axis 107*a* from the inlet side to the outlet side. A surface surrounded by the inlet opening peripheral edge 107I is an inlet opening surface 107G of the injection hole 107.

As illustrated in FIGS. 3 and 4, the peripheral edge portion 107A on the radial center side and the peripheral edge portion 107B on the radial outer peripheral side are defined as points on a plane that is parallel to the injection-hole center axis 107*a* and passes through the injection-hole center axis 107*a*, that is, on a plane including the injection-hole center axis 107*a*. In this case, a straight line connecting the peripheral edge portion 107A on the radial center side and the peripheral edge portion 107B on the radial outer peripheral side is along the radial direction about the injection-valve center axis 101*a* on the plan view of FIG. 4. Further, the peripheral edge portions 107C and 107D in the lateral direction are defined as points on a plane that is parallel to the injection-hole center axis 107*a* and passes through the injection-hole center axis 107*a*. In this case, the plane including the peripheral edge portions 107C and 107D perpendicularly intersects with a plane including the peripheral edge portions 107A and 107B. Thus, a straight line connecting the peripheral edge portions 107C and 107B is perpendicular to the straight line (radial direction) connecting the peripheral edge portions 107A and 107B, on the plan view of FIG. 4.

FIG. 3 illustrates curved surface portions 107AE and 107BE. The curved surface portion 107AE is a curved surface portion (center-side curved surface portion) formed between an end portion 107FAa on the radial center side in the end portion 107FI of the inner peripheral surface 107F of the injection hole 107 on the inlet side and the peripheral edge portion 107A of the inlet opening peripheral edge 107I on the radial center side (on the inner side of the radial center-side peripheral edge portion 107A). The curved surface portion 107BE is a curved surface portion (outer-peripheral-side curved surface portion) formed between an end portion 107FBa on the radial outer peripheral side in the end portion 107FI of the inner peripheral surface 107F of the injection hole 107 on the inlet side and the peripheral edge portion 107B of the inlet opening peripheral edge 107I on the radial outer peripheral side (on the inner side of the radial outer-peripheral-side peripheral edge portion 107B).

Further, in the present embodiment, when the surface of the curved surface portion 107E is formed in an arc shape, the curvature of the radial center-side peripheral edge portion 107A is set to be smaller than the curvature of the radial outer-peripheral-side peripheral edge portion 107B. That is, the magnitude of the curvature radius of the radial center-side peripheral edge portion 107A is larger than the curvature radius of the radial outer-peripheral-side peripheral edge portion 107B.

Further, in the present embodiment, the curvatures of the peripheral-direction peripheral edge portions 107C and 107D are set to be larger than the curvatures of the radial center-side peripheral edge portion 107A. That is, the curvature radii of the peripheral-direction peripheral edge portions 107C and 107D are set to be smaller than the curvature radius of the radial center-side peripheral edge portion 107A.

In the present embodiment, the surface of the curved surface portion 107E is a surface forming an arc shape in the cross section in FIG. 3, and is configured as a curvature forming portion having a curvature. Thus, in FIG. 4, the width W107AE of the curved surface portion 107AE formed on the inner side of the radial center-side peripheral edge portion 107A is larger than the width W107BE of the curved surface portion 107BE formed on the inner side of the radial outer-peripheral-side peripheral edge portion 107B. Further, the width W107AE of the curved surface portion 107AE is larger than the widths W107CE and W107DE of the curved surface portions (peripheral-direction curved surface portions) 107CE and 107DE formed on the inner side of the peripheral-direction peripheral edge portions 107C and 107D.

Note that, even though the surface of the curved surface portion 107E is not an arc-shaped surface having a curvature and is configured to have another curved surface shape, the curved surface portion 107E maybe configured as a curved surface portion in which the width W107AE of the curved surface portion 107AE, the width W107BE of the curved surface portion 107BE, and the widths W107CE and W107DE of the curved surface portions 107CE and 107DE satisfy the above-described relation. That is, in the present invention, the shape of the surface of the curved surface portion 107E is not limited to the arc shape.

Figure 5:
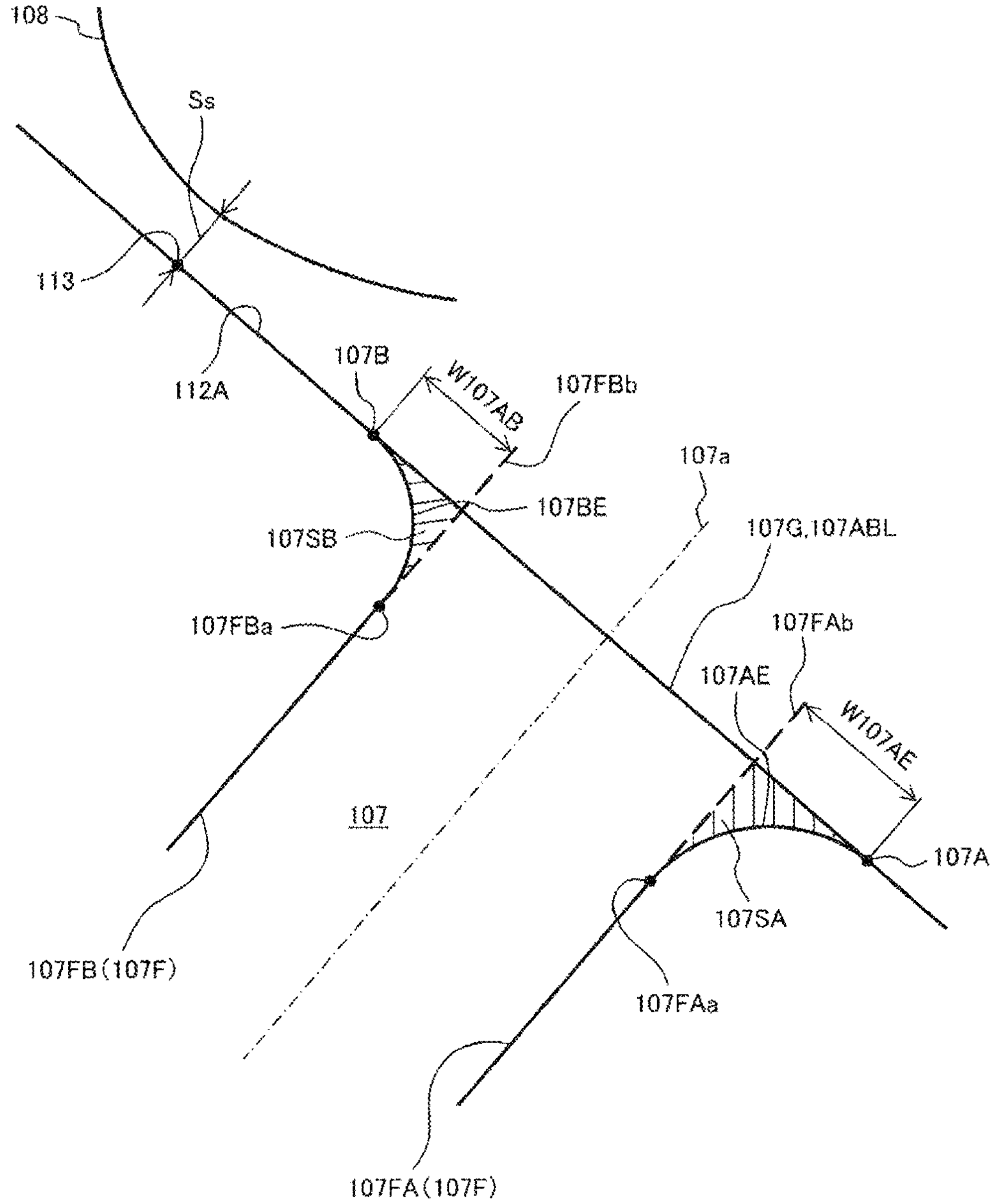
FIG. 5 is a cross-sectional view illustrating a cross section that includes the center axis of the injection hole and passes through a peripheral edge portion on a radial center side and a peripheral edge portion on a radial outer peripheral side in the embodiment of the injection hole according to the present invention.

Further, FIG. 5 illustrates a cross section of the injection hole according to the present embodiment, that includes the injection-hole center axis 107*a* and passes through the peripheral edge portion 107A on the radial center side and the peripheral edge portion 107B on the radial outer peripheral side. Note that, in FIG. 5, the inner peripheral surface of the injection hole 107 is a cylindrical surface, and the center axis 107*a* of the injection hole is perpendicular to the conical surface 112A in FIG. 5.

In the cross section of FIG. 5, a shaded portion 107SA indicates a portion (range) surrounded by the curved surface portion 107AE on the radial center side, which is formed on the inner side of the peripheral edge portion 107A on the radial center side, an extension line 107FAb of an inner peripheral surface portion (radial-center-side inner peripheral surface portion) 107FA connected to the curved surface portion 107AE on the radial center side in the inner peripheral surface 107F, and a straight line 107ABL connecting the peripheral edge portion 107A on the radial center side and the peripheral edge portion 107B on the radial outer peripheral side. Further, a shaded portion 107SB indicates a portion (range) surrounded by the curved surface portion 107BE on the radial outer peripheral side, which is formed on the inner side of the peripheral edge portion 107B on the radial outer peripheral side, an extension line 107FBb of the inner peripheral surface portion (radial outer-peripheral-side inner peripheral surface portion) 107FB connected to the curved surface portion 107BE on the radial outer peripheral side in the inner peripheral surface 107F, and a straight line 107ABL.

In the present embodiment, the area of the shaded portion 107SA is larger than the area of the shaded portion 107SB from the relation of the curvature radius. Note that, even though the surface of the curved surface portion 107E is not an arc-shaped surface having a curvature and is configured to have another curved surface shape, the curved surface portion may be configured as a curved surface portion in which the area of the shaded portion 107SA and the area of the shaded portion 107SB satisfy the above-described relation.

Further, in the present embodiment, from the relation of the curvature radius, the length of a curve (arc) connecting the point 107A and the point 107FAa is longer than the length of a curve (arc) connecting the point 107B and the point 107FBa on the cross-sectional view of FIG. 5. Here, the point 107FAa is a connection point between the inner peripheral surface portion 107FA and the curved surface portion 107AE, and is an upstream end portion of the inner peripheral surface portion 107FA. The point 107FBa is a connection point between the inner peripheral surface portion 107BA and the curved surface portion 107BE, and is an upstream end portion of the inner peripheral surface portion 107BA. Note that, even though the surface of the curved surface portion 107E is not an arc-shaped surface having a curvature and is configured to have another curved surface shape, the curved surface portion may be configured so that the length of the curve connecting the point 107A and the point 107FAa is longer than the length of the curve connecting the point 107B and the point 107FBa.

Since the curvature is provided on the entire periphery of the inlet opening peripheral edge 107I of the injection hole 107, it is possible to cause the inward flow velocity of the fuel from the radial outer peripheral side of the injection hole 107 toward the center of the injection hole 107 to continue over the entire periphery of the inlet opening peripheral edge 107I of the injection hole 107. When there is a discontinuous portion in the inward flow velocity, the flow is likely to be separated at that portion. However, when the inward flow velocity is continuous, it is possible to suppress the separation.

The balance of the flow velocity in the injection hole 107 will be described with reference to FIGS. 6, 7A, and 7B.

Figure 6:
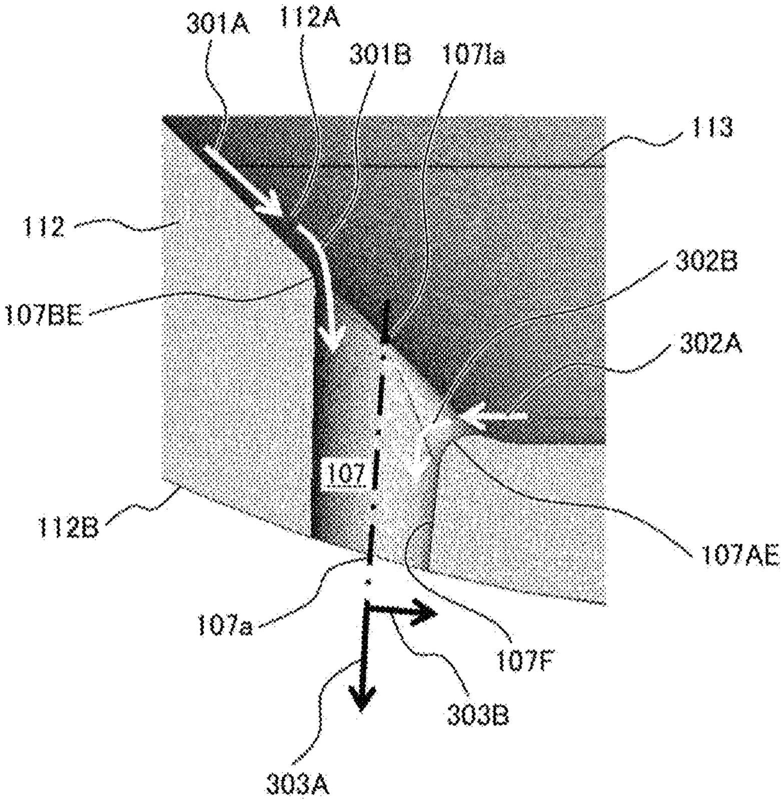
FIG. 6 is a cross-sectional view illustrating the injection hole in the first embodiment.

FIG. 6 illustrates the flow of fuel in the injection hole 107.

**107*a* indicates the center axis of the injection hole 107 (injection-hole center axis). In the present embodiment, the cross section of the injection hole 107 forms a circular shape, and the center axis 107*a* is an axis passing through the center of a circle formed by the cross section of the injection hole 107. When the inner peripheral surface 107F of the injection hole 107 is formed in a cylindrical shape, the center axis 107*a*** is a straight line passing through the center of the cylindrical shape.

301A indicates a flow velocity vector of the fuel flowing into the injection hole 107 from the outer peripheral side (radial outer peripheral side) before flowing into the injection hole 107. 302A indicates a flow velocity vector of the fuel flowing into the injection hole 107 from the center axis **101*a* side (radial center side) of the fuel injection valve 101 before flowing into the injection hole 107. 301B indicates a flow velocity vector when flowing from the radial outer peripheral side into the injection hole 107. 302B indicates a flow velocity vector when flowing from the radial center side into the injection hole 107. 303A indicates a fuel flow velocity vector in a coaxial direction with the center axis 107*a* of the injection hole 107. 303B indicates a fuel flow velocity vector in a direction perpendicular to the center axis 107*a* of the injection hole 107**.

In the following description, although description will be made on the assumption that the curved surface portion 107E is a curved surface having a curvature, as described above, the curved surface portion 107E is not limited to the curved surface having a curvature.

In the inlet opening peripheral edge 107I of the injection hole 107, the curvature radius of the curved surface portion 107AE formed on the inner side of the peripheral edge portion 107A on the radial center side is set to be larger than the curvature radius of the curved surface portion 107BE formed on the inner side of the peripheral edge portion 107B on the radial outer peripheral side. In this manner, it is possible to increase the flow velocity of the fuel flow indicated by the flow velocity vector 302B. Therefore, it is possible to reduce a difference between the flow velocity (absolute value) of the fuel flow indicated by the flow velocity vector 301B and the flow velocity (absolute value) of the fuel flow indicated by the flow velocity 302B.

Description will be made below on the assumption that the fuel flows or the flow velocities indicated by the flow velocity vectors 302A and 302B are the fuel flows 302A and 302B or the flow velocities 302A or 302B, respectively. Further, description will be made below on the assumption that the fuel flows or the flow velocities indicated by the flow velocity vectors 301A and 301B are the fuel flows 301A and 301B or the flow velocities 301A or 301B, respectively.

The fuel flow 301B and the fuel flow 302B can cancel each other out when the respective flow velocities flow into the injection hole 107, and can flow into the injection hole 107 without separation at the inlet opening peripheral edge 107I portion of the injection hole 107, as indicated by arrows 301B and 302B. Therefore, it is possible to suppress the flow velocity component 303B perpendicular to the center axis **107*a* of the injection hole 107, which is generated in the fuel flow when the fuel is injected from the injection hole 107, and to increase the flow velocity component 303A in the coaxial direction with the center axis 107*a***.

Figure 7A:
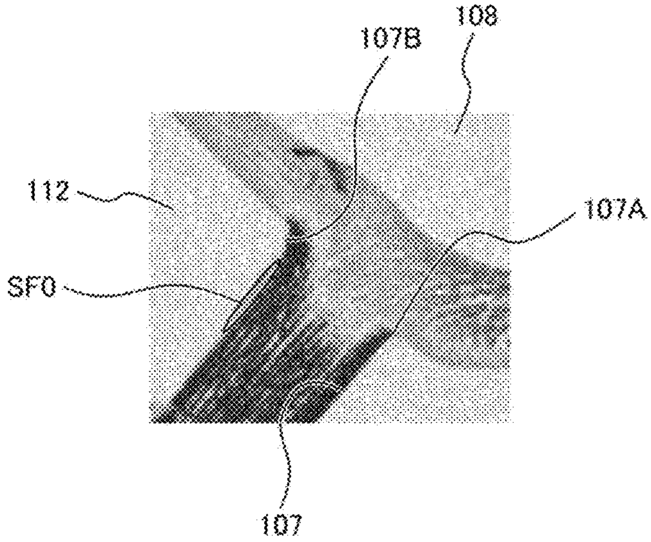
FIG. 7A is a diagram illustrating a result obtained by simulating a flow of fuel in the injection hole according to the embodiment of the present invention.

FIG. 7A is a diagram illustrating a result obtained by simulating the flow of fuel in the injection hole 107 according to the present embodiment. FIG. 7B is a diagram illustrating the result of simulating the flow of fuel in an injection hole 107' in the comparative example of the present invention. 107', 107A', 107B', 108', and 112' illustrated in FIG. 7B indicate components in the comparative example corresponding to the injection hole 107, the peripheral edge portion 107A on the radial center side, the peripheral edge portion 107B on the radial outer peripheral side, the valve body 108, and the injection-hole forming member 112 in the present embodiment.

In the present embodiment, by increasing the flow velocity of the fuel flow 302B to approach the flow velocity of the fuel flow 301B, the fuel flow 302B and the fuel flow 301B interfere with and add each other to flow along the inner peripheral surface 107F of the injection hole 107. Thus, it is possible to not cause the flow separation or to suppress an occurrence of the flow separation, and to cause the fuel to flow into the injection hole 107.

Figure 7B:
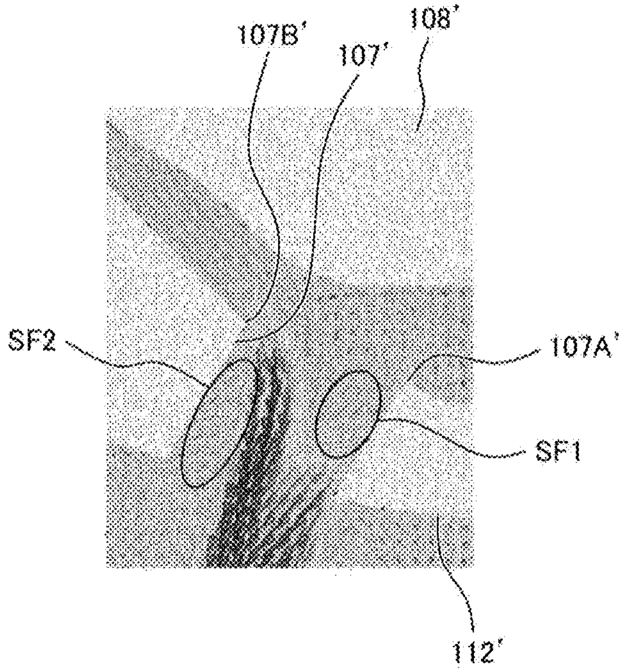
FIG. 7B is a diagram illustrating a result obtained by simulating a flow of fuel in an injection hole in a comparative example of the present invention.

In FIG. 7B as the comparative example of the present invention, a region SF1 of a slow fuel flow velocity is formed in a large range on the peripheral edge portion 107A' side on the radial center side, and a region SF2 of fuel flow separation is formed in a large range on the peripheral edge portion 107B' side on the radial outer peripheral side. On the other hand, in the present embodiment, as illustrated in FIG. 7A, the fuel flow velocity on the peripheral edge portion 107A side on the radial center side increases, and forming a region SF0 of the fuel flow separation on the peripheral edge portion 107B on the radial outer peripheral side is suppressed to a very small range.

That is, in the present embodiment, since it is possible to ensure the continuity of the inward flow velocity and the balance of the inward flow velocity, the effect of suppressing the flow separation is extremely high, and it is possible to supply the fuel into the injection hole 107 with high efficiency. Therefore, it is possible to increase the fuel pressure in the injection hole 107.

Figure 8:
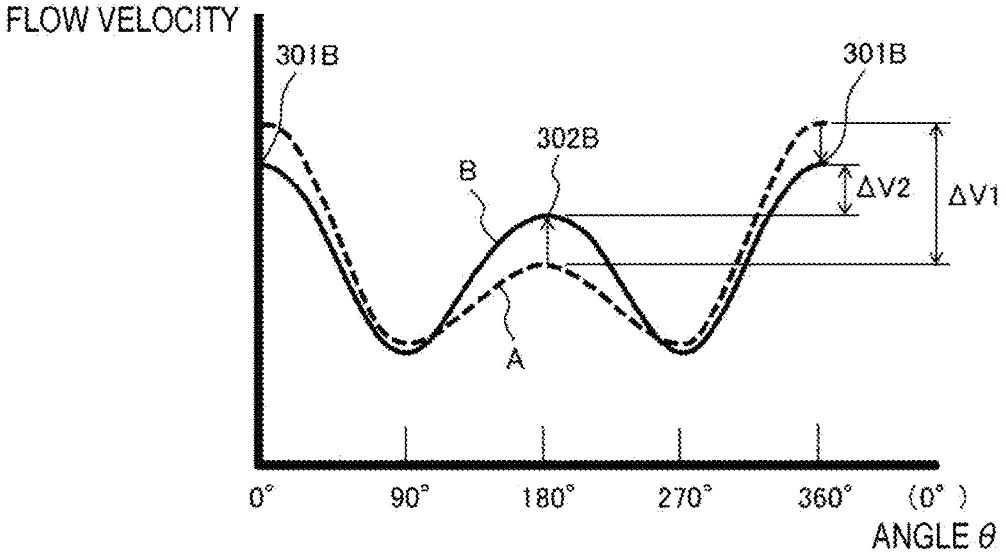
FIG. 8 is a conceptual diagram illustrating a relation between a flow velocity of the fuel flowing into the injection hole.
Figure 8:
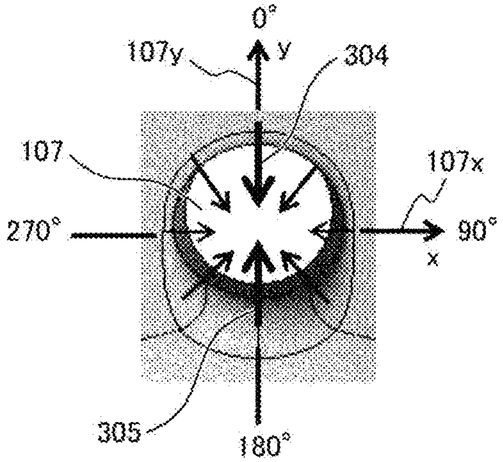

Here, the relation of the flow velocity of the fuel flowing into the injection hole 107 will be supplementarily described with reference to FIG. 8. FIG. 8 is a conceptual diagram illustrating a relation between a flow velocity of the fuel flowing into the injection hole. The lower part of FIG. 8 illustrates an explanatory diagram relating to the definition of an angle in the y-axis 107*y* of FIG. 2, in which the radial outer peripheral side is set as 0° and the radial center side (center axis 101*a* side) is set as 180°. The upper part of FIG. 8 illustrates a conceptual diagram illustrating the change of the flow velocity with respect to the angle when a horizontal axis indicates the angle of 0° to 360° (0°), and a vertical axis indicates the flow velocity of the fuel flow toward the injection hole 107. In FIG. 8, A indicates flow velocity distribution to which the present invention is applied, and B indicates flow velocity distribution when a rounded portion (curved surface portion, curved portion) having a constant curvature is provided on an inner side of the inlet opening peripheral edge 107I over the entire periphery of the inlet opening peripheral edge 107I of the injection hole.

In the present embodiment, when the curvature radius of the inner side of the peripheral edge portion 107A on the radial center side is set to be larger than the curvature radius of the inner side of the peripheral edge portion 107B on the radial outer peripheral side, the flow velocity 302B becomes faster and the flow velocity 301B becomes slower. Here, the flow velocity 301B is decreased by the increase in the flow velocity 302B. Thus, a velocity difference AV2 between the flow velocity 301B (0°) of the fuel flow flowing into the injection hole 107 from the radial outer peripheral side and the flow velocity 302B (180°) of the fuel flow flowing into the injection hole 107 from the radial center side can be smaller than a velocity difference ΔV1 when a rounded portion having a constant curvature is provided over the entire periphery of the inlet opening peripheral edge 107I, and thus it is possible to reduce the velocity difference between the flow velocity 302B and the flow velocity 301B.

Next, the effect of the inner curvature of the peripheral edge portions 107C and 107D in the circumferential direction will be described.

When the curvature radii of the inner side of the peripheral edge portions 107C and 107D in the circumferential direction are set to be smaller than the curvature radius of the peripheral edge portion 107A on the radial center side, it is possible to reduce the fuel flow flowing into the injection hole 107 from the peripheral edge portions 107C and 107D in the circumferential direction, and to increase the fuel flows 302B and 301B flowing into the injection hole 107 from the peripheral edge portion 107A on the radial center side and the peripheral edge portion 107B on the radial outer peripheral side. Therefore, it is possible to suppress the flow velocity component 303B perpendicular to the center axis 107*a* of the injection hole 107. Further, the difference between the flow velocity of the fuel flow 302B and the flow velocity of the fuel flow 301B is further reduced. Thus, it is possible to suppress the separation of the fuel flow in the injection hole 107 and to increase the pressure of the fuel in the injection hole 107.

As illustrated in FIG. 8, the flow velocities at 90° and 270° is slower than the flow velocities at 0° and 180°. This is because a large amount of fuel originally flows into the injection hole 107 from the radial outer peripheral side, and then a large amount of fuel flows into the injection hole 107 from the radial center side. In addition, setting the curvature radius of the inner side of the peripheral edge portions 107C and 107D in the circumferential direction to be smaller than the curvature radius of the inner side of the peripheral edge portion 107A on the radial center side also has an effect.

By reducing the curvature radius, the resistance of the fuel flow flowing into the injection hole 107 increases. Therefore, the flow velocity of the fuel flow decreases, but it is possible to reduce the difference in the flow velocity of the fuel flowing into the injection hole 107 from the radial outer peripheral side and the radial center side. Thus, it is possible to reduce the separation of the fuel flowing into the injection hole 107, particularly, from the radial outer peripheral side, and to increase the pressure in the injection hole.

In the present embodiment, the peripheral edges of the inlet openings of all injection holes are provided with a curvature, but the curvature may be provided only for the injection holes with low pressure and the injection holes with a large adhering amount of fuel at the injection hole outlets. Further, the magnitude of the curvature maybe set to a magnitude different for each injection hole.

Further, the magnitude of the curvature radius of the inner side of the peripheral edge portions 107C and 107D may be set to different between the peripheral edge portion 107C side and the peripheral edge portion 107D side so long as the above magnitude is smaller than the magnitude of the curvature radius of the peripheral edge portion 107A on the radial center side. For example, the flow velocities of the fuel flowing into the plurality of injection holes 107 may differ depending on the arrangement of the injection holes 107. In this case, the magnitude of the curvature radius may be changed between the peripheral edge portion 107C side and the peripheral edge portion 107D side, in accordance with the flow velocity of the fuel flowing into each injection hole 107.

In the present embodiment, the description is made with the curvature having a roundness. The shape may not have a curvature so long as the flow velocity of the fuel flowing into the injection hole 107 is balanced in a similar manner to that in the present embodiment. For example, instead of an arc shape (curved surface) having a curvature, a chamfer-like structure may be used. The curved surface portion or chamfer formed on the inner side of the peripheral edge portions 107A, 107B, 107C, and 107D of the inlet opening peripheral edge 107I of the injection hole 107 constitutes a flow velocity adjusting portion. The flow velocity adjusting portion on the peripheral edge portion 107A side has a larger effect of increasing the fuel flow than the flow velocity adjusting portion on the peripheral edge portion 107B side. Further, the flow velocity adjusting portions of the peripheral edge portions 107C and 107D have the effect of increasing the fuel flow, which is smaller than that of the flow velocity adjusting portion of the peripheral edge portion 107A.

Generally, since the flow velocity adjusting portion is formed to have an arc shape (curved surface) having a curvature, it is possible to smoothly connect the inlet opening peripheral edge 107I of the injection hole 107 and the inner peripheral surface 107F, and it is easy to design or manufacture the flow velocity adjusting portion. Therefore, from the viewpoint of the design and manufacturing, it is preferable that the flow velocity adjusting portion is formed in an arc shape (curved surface) having a curvature.

In the entire region from the inlet opening surface 107G of the plurality of injection holes 107 to the seat portion 113 in the radial direction about the center axis 101*a*, a cross-sectional area of the fuel flow path formed in the peripheral direction about the center axis 101*a* (cross-sectional area of the fuel flow formed between the conical surface 112A and the valve body 108) Ss is configured to be larger than the sum of the inlet opening area of all the injection holes 107. This is to avoid a decrease in the flow velocity of the fuel flow flowing into the injection hole 107 due to the narrowing of the fuel flow path on the upstream side of the inlet opening surface of the injection hole 107.

Since the angle (inclination angle of the injection hole 107) formed by the center axis 107*a* of the injection hole 107 and the center axis 101*a* of the fuel injection valve 101 is set in accordance with the shape of a combustion chamber, it is possible to set the angle to various inclination angles.

Although the number of injection holes 107 in FIG. 2 is 6, it is not necessary to limit the number to 6, and the number may be set to be less than 6 or 6 or more.

Figure 9:
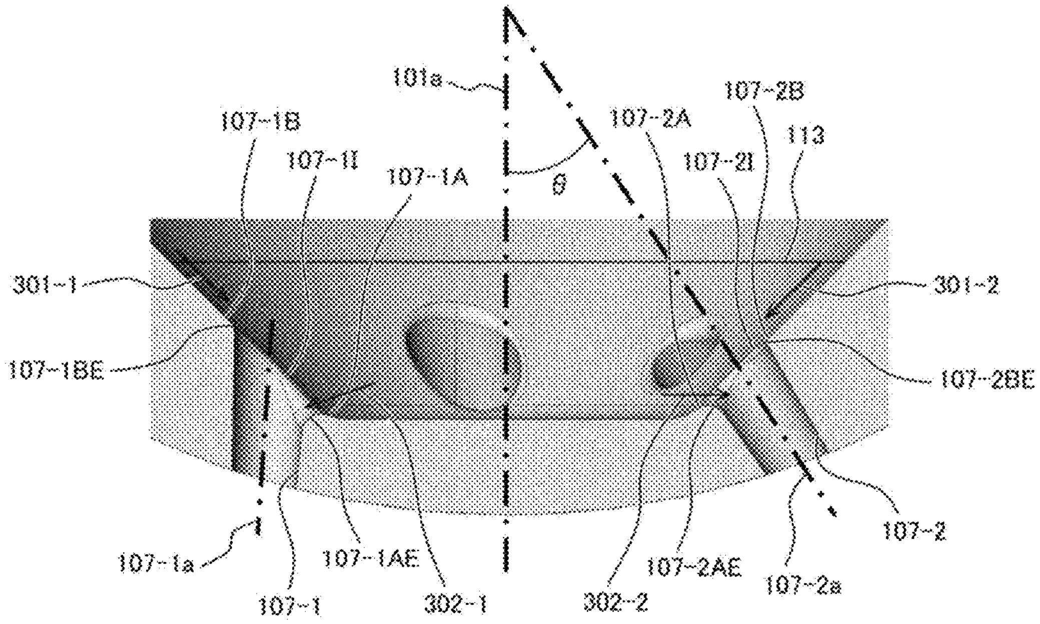
FIG. 9 is a cross-sectional view illustrating an example of setting a curvature of a peripheral edge of an inlet opening in a plurality of injection holes having different inclination angles in the first embodiment.

Next, the setting of the curvature of the injection holes 107 having different inclination angles will be described with reference to FIG. 9. FIG. 9 is a cross-sectional view of a surface including the center axis 101*a* of the fuel injection valve 101, the center axis 107-1*a* of an injection hole 107-1, and the center axis 107-2*a* of an injection hole 107-2. That is, in FIG. 9, the center axis 101*a*, the center axis 107-1*a*, and the center axis 107-2*a* are configured on one plane, but the center axis 101*a*, the center axis 107-1*a*, and the center axis 107-2*a* do not need to be configured on one plane when the inclination angle of the injection hole 107-1 is different from the inclination angle of the injection hole 107-2.

107-1 indicates an injection hole with a small inclination angle θ. 107-2 indicates an injection hole with a large inclination angle θ. In FIG. 9, the inclination angle θ of the injection hole 107-2 is illustrated as the inclination angle θ of the injection hole 107. 107-1*a* represents the center axis of the injection hole 107-1 (injection-hole center axis). 107-2*a* represents the center axis of the injection hole 107-2 (injection-hole center axis).

107-1A represents the peripheral edge portion (center-side peripheral edge portion) on the radial center side in a peripheral edge 107-1I of the inlet opening of the injection hole 107-1. 107-1B represents the peripheral edge portion (outer-peripheral-side peripheral edge portion) on the radial outer peripheral side in the inlet opening peripheral edge 107-1I. 107-2A represents the peripheral edge portion (center-side peripheral edge portion) on the radial center side in an inlet opening peripheral edge 107-2I of the injection hole 107-2. 107-2B represents the peripheral edge portion (outer-peripheral-side peripheral edge portion) on the radial outer peripheral side in the peripheral edge 107-2I of the inlet opening.

The inlet opening peripheral edge 107-1I of the injection hole 107-1 is configured so that a relation between the curvature (curvature radius) of a curved portion 107-1AE on the inner side of a peripheral edge portion 107-1A on the radial center side and the curvature (curvature radius) of the curved portion 107-1BE on the inner side of the peripheral edge portion 107-1B on the radial outer peripheral side is similar to the above-described relation between the curvature (curvature radius) of the peripheral edge portion 107A on the radial center side and the curvature (curvature radius) of the peripheral edge portion 107B on the radial outer peripheral side. Further, the inlet opening peripheral edge 107-2I of the injection hole 107-2 is configured so that a relation between the curvature (curvature radius) of a curved portion 107-2AE on the inner side of a peripheral edge portion 107-2AE on the radial center side and the curvature (curvature radius) of the curved portion 107-2BE on the inner side of the peripheral edge portion 107-2B on the radial outer peripheral side is similar to the above-described relation between the curvature (curvature radius) of the peripheral edge portion 107A on the radial center side and the curvature (curvature radius) of the peripheral edge portion 107B on the radial outer peripheral side.

The curvature radius of the curved portion 107-2AE in the injection hole 107-2 having a large inclination angle θ is configured to be larger than the curvature radius of the curved portion 107-1AE in the injection hole 107-1 having a small inclination angle θ.

Next, the effect of the configuration described with reference to FIG. 9 will be described. 301-1 indicates a flow velocity vector from the radial outer peripheral side of the injection hole 107-1 toward the injection hole 107-1. 302-1 indicates the flow velocity vector from the radial center side of the injection hole 107-1 toward the injection hole 107-1. 301-2 indicates a flow velocity vector from the radial outer peripheral side of the injection hole 107-2 toward the injection hole 107-2. 302-2 indicates a flow velocity vector from the radial center side of the injection hole 107-2 toward the injection hole 107-2.

Description will be made below on the assumption that the fuel flows or the flow velocities indicated by the flow velocity vectors 301-1, 302-1, 301-2, and 302-2 are the fuel flows 301-1, 302-1, 301-2, and 302-2 or the flow velocities 301-1, 302-1, 301-2, and 302-2, respectively.

In the injection hole 107-2 having a large inclination angle θ, the flow velocity component of the fuel flow 301-2 flowing from the radial outer peripheral side into the injection hole in a direction perpendicular to the center axis 107-2*a* increases in an inlet portion of the injection hole 107-2, in comparison to the injection hole 107-1 having a small inclination angle θ. Therefore, since the curvature radius of the inner side of the peripheral edge portion 107-2A of the injection hole 107-2 is set to be larger than the curvature radius of the inner side of the peripheral edge portion 107-1A of the injection hole 107-1, flow path resistance of the fuel flow 302-2 when the fuel flows into the injection hole 107-2 is reduced, and thus it is possible to increase the flow velocity of the fuel flow 302-2 flowing into the injection hole 107-2 from the radial center side. Thus, it is possible to reduce the velocity difference (absolute value) between the flow velocity of the fuel flow 301-2 and the flow velocity of the fuel flow 302-2.

Thus, the fuel flow 301-2 and the fuel flow 302-2 interfere with and add each other to flow along the inner peripheral surface of the injection hole 107-2. Thus, it is possible to suppress the generation and increase of the flow velocity component perpendicular to the center axis 107-2*a* of the injection hole 107-2. Therefore, it is possible to cause the fuel to flow into the injection hole 107-2 without causing the flow separation, and to increase the fuel pressure in the injection hole.

In the present embodiment, it is possible to make it difficult to create a state in which the pressure in the injection hole is low at a specific injection hole 107-2 of the plurality of injection holes 107-1 and 107-2. Therefore, it is possible to suppress fuel adhesion around the outlets of the plurality of injection holes 107-1 and 107-2.

Next, the relation between the pressure in the space in the injection hole 107 and the pressure applied to the fuel injection valve will be described with reference to FIGS. 10 and 11.

Figure 10:
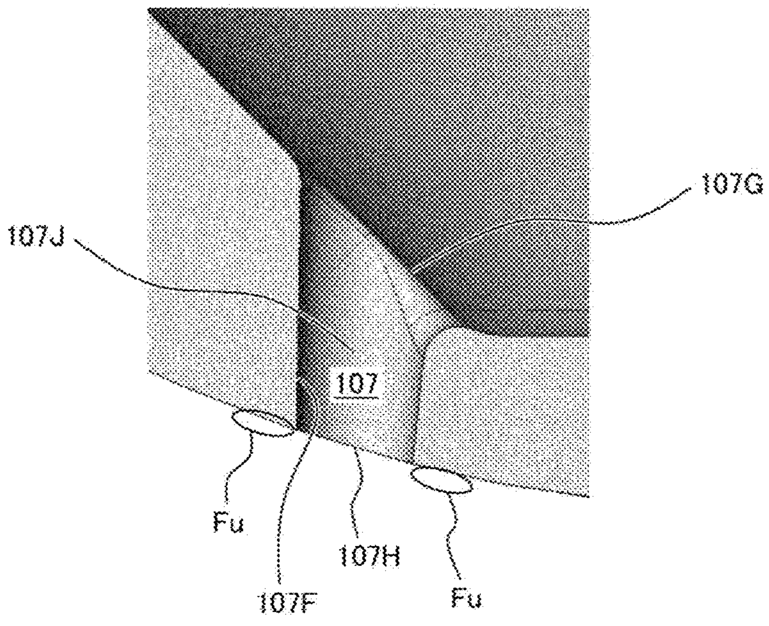
FIG. 10 is a conceptual diagram illustrating fuel injection around an injection hole outlet in the first embodiment.

FIG. 10 is a view illustrating the same cross section as that in FIG. 6. 107G indicates the inlet opening surface of the injection hole 107. 107H indicates the outlet opening surface of the injection hole 107. 107F indicates the inner peripheral surface (side surface) of the injection hole 107. Further, 107J indicates the spatial volume of the injection hole 107 surrounded by the inlet opening surface 107G, the outlet opening surface 107H, and the inner peripheral surface 107F. Fu indicates the adhering fuel that adheres to the nozzle surface when the fuel injected from the injection hole 107 is scattered.

Figure 11:
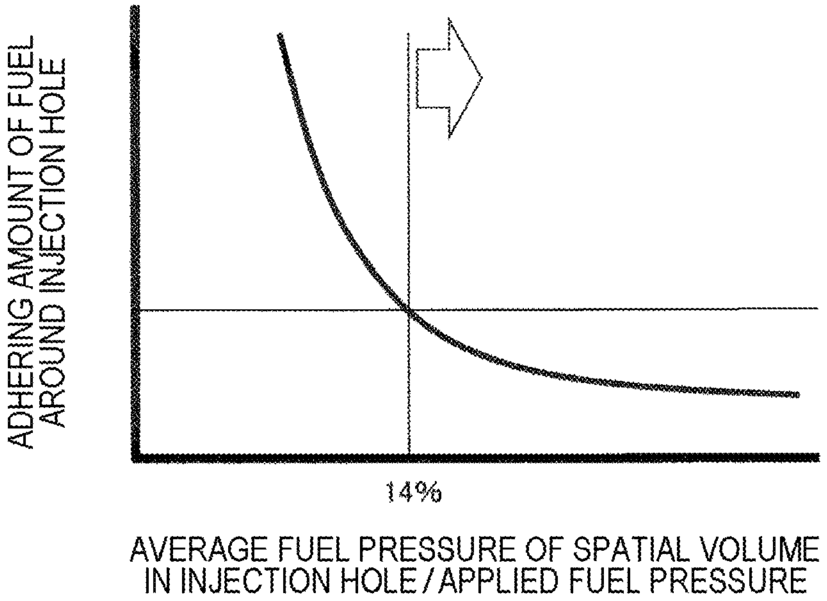
FIG. 11 is a diagram illustrating a relation between average pressure in the injection hole with respect to applied fuel pressure to a fuel injection valve, and an adhering amount of the fuel in the first embodiment.

FIG. 11 illustrates the relation between the pressure of a spatial volume 107J of the injection hole 107 and the amount of the adhering fuel Fu adhering to the nozzle surface when the fuel flows out from the injection hole 107. In FIG. 11, a vertical axis indicates the amount of adhering fuel Fu, and a horizontal axis represents the ratio of the average fuel pressure of a spatial volume 107J to the pressure (fuel pressure) applied to the fuel injection valve. In this case, the fuel pressure maybe considered as the pressure in a fuel pipe that supplies fuel to the fuel injection valve 101.

By adopting the curvature of the present embodiment described above for the inlet opening peripheral edge 107I of the injection hole, when the valve body 108 is lift to the maximum, the average value of the fuel pressure in the injection hole with respect to the fuel pressure applied to the fuel injection valve 101 is equal to or more than 14%. That is, the average value of the fuel pressure on the inside (spatial volume) 107J of the injection hole 107 with respect to the pressure (fuel pressure) of the fuel on the upstream side of the seat portion 113 is equal to or more than 14%. This condition may be satisfied by at least one or more injection holes among the plurality of injection holes 107.

When the valve body 108 is lift to the maximum, the average fuel pressure of the spatial volume 107J in at least one injection hole 107 of the plurality of injection holes 107 has a value of 14% or more with respect to the pressure of the fuel on the upstream side of the seat portion 113. Thus, a state where the pressure of the fuel in the spatial volume 107J of the injection hole 107 is higher than the saturated vapor pressure occurs, and thus it is possible to suppress an occurrence of cavitation in the injection hole 107. Thus, the generation of the flow velocity component in the direction perpendicular to the center axis 107*a* of the injection hole 107 is suppressed, and the fuel adhesion to the vicinity (nozzle surface) of the injection hole outlet is suppressed.

Figure 12:
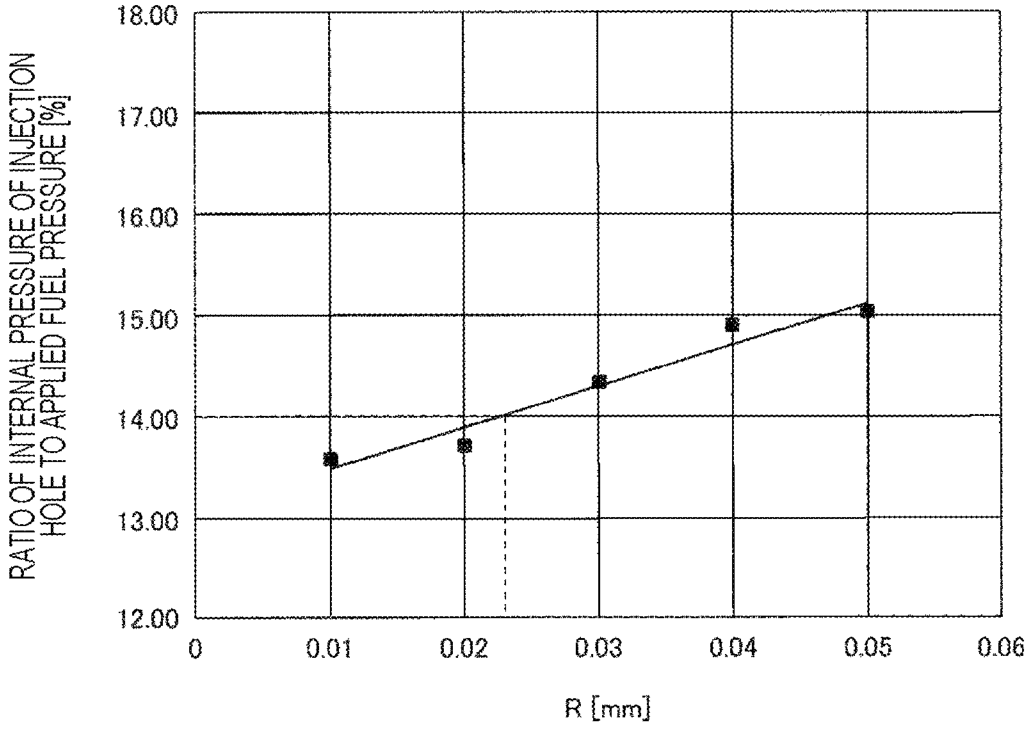
FIG. 12 is a diagram illustrating a relation between a curvature radius of a curved portion 107AE formed on an inner side of a peripheral edge portion 107A on the center side in a radial direction, and a ratio of internal pressure of an injection hole 107 to the applied fuel pressure.

FIG. 12 is a diagram illustrating the relation between a curvature radius R of the curved portion 107AE formed on an inner side of the peripheral edge portion 107A on the center side in the radial direction and the ratio of the internal pressure of the injection hole 107 to the applied fuel pressure. As illustrated in FIG. 12, in order to make a configuration in which the average value of the fuel pressure in the injection hole 107 (spatial volume) 107J is set to be equal to or more than 14% with respect to the fuel pressure on the upstream side of the seat portion 113, the curved surface portion 107AE on the radial center side is preferably formed so that the curvature radius is equal to or more than 0.023 mm.

The purpose of securing that the fuel pressure in the injection hole 107 has average fuel pressure of 14% or more with respect to the fuel pressure is to sufficiently reduce the amount of fuel adhering to the nozzle surface, and to suppress an occurrence of a situation in which the adhering fuel Fu functions as a starting point for generating suspended particulate matter, by suppressing combustion in a state in which the adhering fuel Fu has high fuel concentration. Therefore, it is necessary to configure at least one injection hole 107 to have pressure in the injection hole, which is equal to or more than 14% of the fuel pressure in order to sufficiently reduce the amount of fuel adhering to the nozzle surface.

Figure 13:
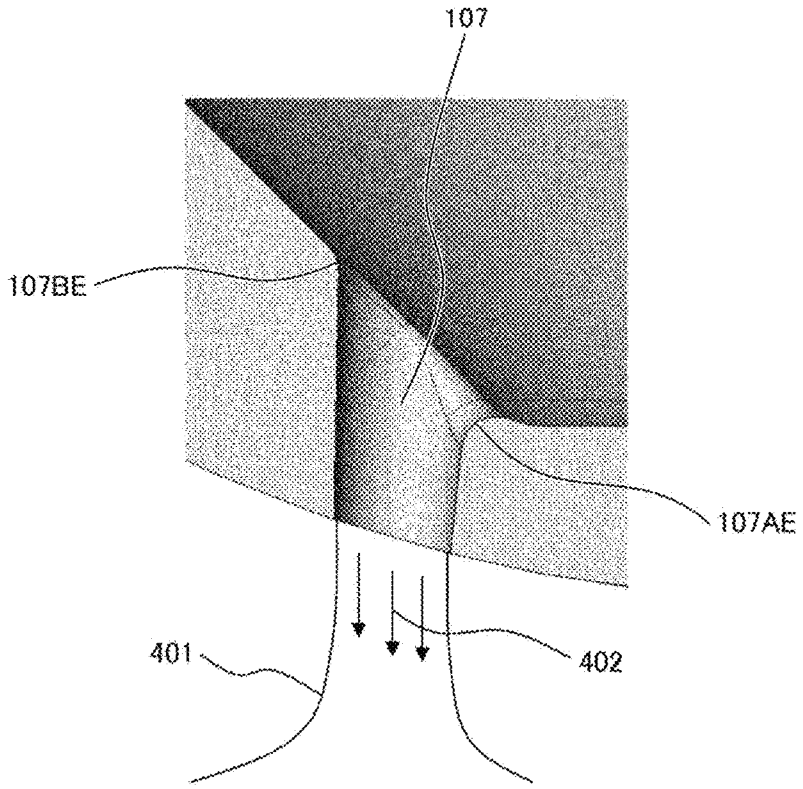
FIG. 13 is a conceptual diagram illustrating characteristics of fuel spraying in the first embodiment.

The spraying shape of the present embodiment will be described with reference to FIG. 13. FIG. 13 is a conceptual diagram illustrating the characteristics of the fuel spraying in the first embodiment.

In the fuel injection valve that injects fuel directly into the combustion chamber, the pressure in the combustion chamber to which the fuel is injected differs depending on the amount of intake air according to the load of the engine and the timing of injection. Air resistance is reduced when the pressure in the combustion chamber is lower than atmospheric pressure. Therefore, a spray 401 has a downwardly convex contour shape as illustrated in FIG. 13.

The shape of the spray 401 will be described in more detail. The shape of the spray 401 is formed in a manner that the pressure in the injection hole is kept high as described above, and thus the flow velocity 402 in the coaxial direction with the center axis 107*a* of the injection hole 107 when sprayed from the injection hole outlet is increases, and the flow velocity in the direction perpendicular to the center axis 107*a* is reduced. Therefore, when the fuel flows out from the injection hole 107, the fuel spreads little in the direction perpendicular to the center axis 107*a* and proceeds in the direction along the center axis 107*a*. Then, the spray 401 is located at a position away from the injection hole outlet, and becomes wider in the direction perpendicular to the center axis 107*a* as the distance from the injection hole outlet increases. Therefore, the spray 401 has a downwardly convex spray contour shape.

In the spray 401, the velocity component spreading in the direction perpendicular to the center axis 107*a* is sufficiently small in the vicinity of the injection hole outlet, so that it is possible to suppress fuel from adhering to the nozzle surface in the vicinity of the injection hole outlet. Further, the shape of the spray 401 becomes a downwardly convex spray contour shape when sprayed into the combustion chamber having pressure lower than the atmospheric pressure, and it is possible to check the vicinity of the outlet of the injection hole 107 by magnifying and observing the vicinity of the outlet of the injection hole using a long-distance microscope or the like.

CHANGE EXAMPLE 1

A first change example will be described with reference to FIG. 14. In the present change example, a configuration different from the above-described embodiments will be described. The configuration not particularly described is similar to that of the above-described embodiments, or the configuration described in the above-described embodiments can be applied. A combination with other change examples can be made in a range with no structural contradiction.

Figure 14:
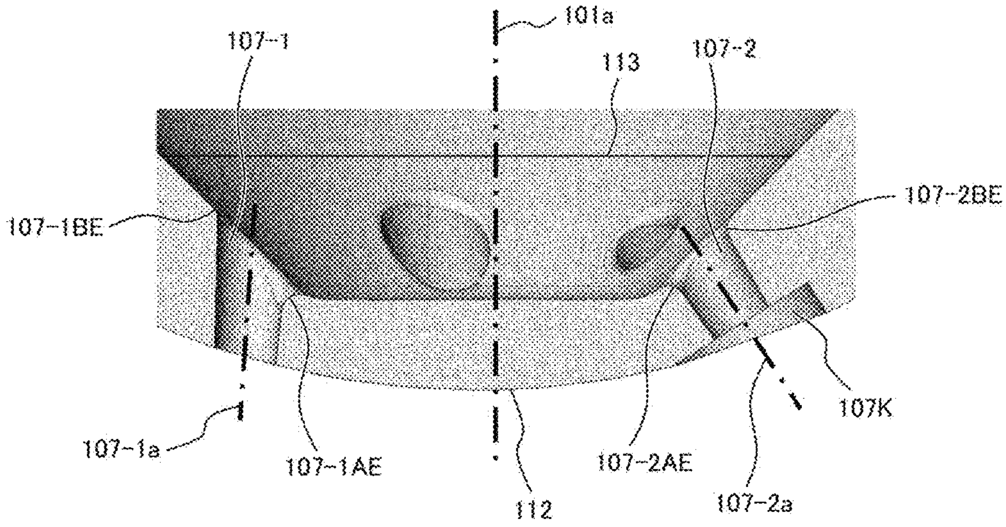
FIG. 14 is a cross-sectional view illustrating a change example (Change Example 1) of the injection hole in the first embodiment.

FIG. 14 illustrates a state in which a counterbore is attached to the outlet portion of the injection hole 107-2 of FIG. 9.

107K indicates the counterbore. The counterbore 107K is formed in a concave shape on the surface (nozzle surface) of the injection-hole forming member 112. The counterbore 107K may be provided at the outlet portion of the injection hole 107 (107-1, 107-2) so that the spray discharged from the injection hole does not come into contact with the outlet portion. It is not necessary to provide the counterbore 107K in all of the plurality of injection holes, and it is preferable to provide the counterbore 107K in the specified injection hole where the spray may interfere. In particular, in the injection hole having a large inclination angle θ, since it is difficult to increase the internal pressure of the injection hole, the spray tends to spread in the direction perpendicular to the center axis 107*a* of the injection hole 107. Thus, the counterbore 107K may be provided in the injection hole having a large inclination angle θ.

According to the present change example, it is possible to obtain the similar effects to those in the above-described embodiments. In addition, by providing the counterbore 107K in the specific injection hole 107, it is possible to reduce the fuel adhesion to the nozzle surface even though the flow velocity component in the direction perpendicular to the center axis 107*a* of the injection hole 107 increases.

CHANGE EXAMPLE 2

A second change example will be described with reference to FIG. 15. In the present change example, a configuration different from the above-described embodiments will be described. The configuration not particularly described is similar to that of the above-described embodiments, or the configuration described in the above-described embodiments can be applied. A combination with other change examples can be made in a range with no structural contradiction.

Figure 15:
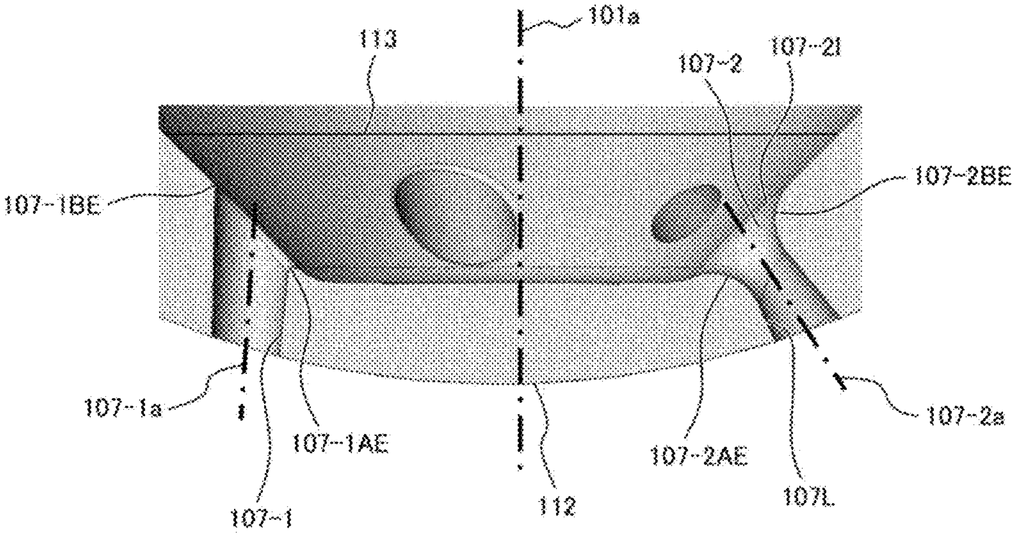
FIG. 15 is a cross-sectional view illustrating a change example (Change Example 2) of the injection hole in the first embodiment.

FIG. 15 illustrates a cross section of a change example (Change Example 2) of the injection hole in the first embodiment. The injection hole 107-2 on the side with a large inclination angle 0 has an inner peripheral surface (side surface) 107L in which the cross-sectional area of the injection hole (cross-sectional area perpendicular to the center axis 107-2*a*) increases toward the outlet side (downstream side).

In the present change example, the inner peripheral surface 107L having a wide cross-sectional area is provided in the specific injection hole 107-2, but may be provided in all the injection holes. Even in a case of a shape in which the cross-sectional area increases toward the outlet of the injection hole, the curvature radius of the peripheral edge portion 107-2A side on the radial center side of the inlet opening peripheral edge 107-2I is increased. Further, when a plurality of injection holes have a shape in which the cross-sectional area increases toward the outlet, the curvature radius of the inlet opening peripheral edge on the radial center side maybe increased by the limit to a specific hole. As described above in the above embodiments, the curvature radius of the peripheral edge portion of the injection hole 107 having a large inclination angle θ and the injection hole having low pressure of the fuel may be increased.

According to the present change example, even when it is desired to inject the fuel with spreading the spray injected from the injection hole, it is possible to obtain the similar effects to those in the above-described embodiments.

CHANGE EXAMPLE 3

A third change example will be described with reference to FIGS. 16 and 17. In the present change example, a configuration different from the above-described embodiments will be described. The configuration not particularly described is similar to that of the above-described embodiments, or the configuration described in the above-described embodiments can be applied. A combination with other change examples can be made in a range with no structural contradiction.

Figure 16:
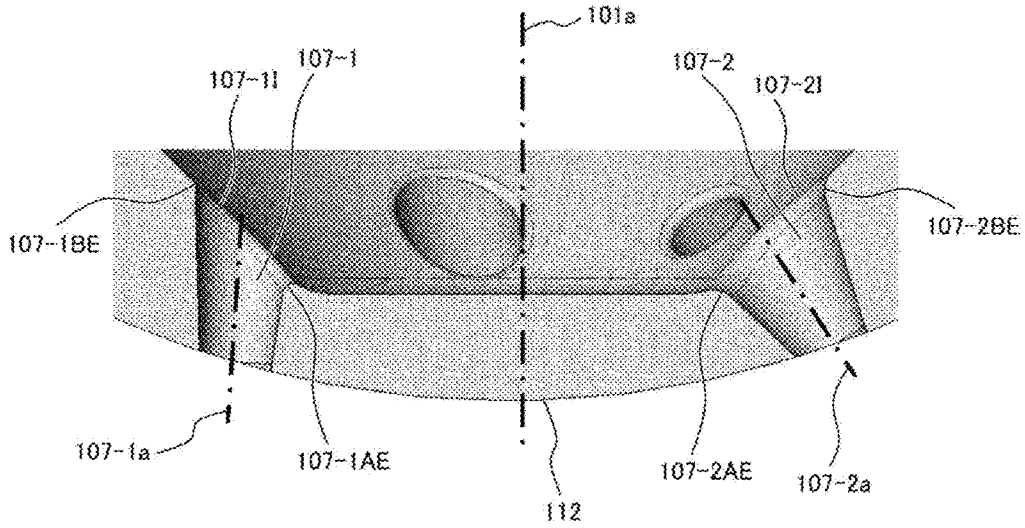
FIG. 16 is a cross-sectional view illustrating a change example (Change Example 2) of the injection hole in the first embodiment.

FIG. 16 illustrates a cross section of a change example (Change Example 2) of the injection hole in the first embodiment.

In the present change example, the diameters of the injection holes 107-1 and 107-2 gradually decrease toward the outlet (downstream side). That is, the injection holes 107-1 and 107-2 have a tapered shape in which the diameter is reduced from the inlet side to the outlet side. In the tapered shape in which the diameters of the injection holes 107-1 and 107-2 gradually decrease toward the outlet (downstream side), the degree of diameter reduction of the injection holes 107 is represented by a tapered angle θp (see FIG. 17).

Even in the present change example, the inclination angle θ of the injection hole is larger in the injection hole 107-2 than in the injection hole 107-1.

It is desirable that the reduction rate of the injection hole diameter is smaller for the injection hole 107-1 having a small inclination angle θ and larger for the injection hole 107-2 having a large inclination angle θ. Further, regarding the curvature radius of the peripheral edge portion on the radial center side of the inlet opening peripheral edge of the injection hole, the curvature radius of the peripheral edge portion 107-2A side on the radial center side of the injection hole 107-2 is configured to be larger than the peripheral edge portion 107-1A side on the radial center side of the injection hole 107-1.

The injection hole 107-1 having a small inclination angle θ has a smaller reduction rate of the injection hole diameter than the injection hole 107-2 having a large inclination angle θ. This is because the pressure in the injection hole tends to increase in the injection hole 107-1 on the side having a small inclination angle θ, whereas the pressure in the injection hole tends to decrease in the injection hole 107-2 on the side having a large inclination angle θ. Therefore, by increasing the reduction rate of the diameter of the injection hole 107-2, the decrease in the pressure in the injection hole of the injection hole 107-2 is suppressed. Regarding the relation of the magnitude of the curvature radius (or curvature) of the inlet opening peripheral edge of the injection hole, it is possible to obtain the similar effects to those in the above-described embodiments with the same configuration as that in the above-described embodiments.

Figure 17:
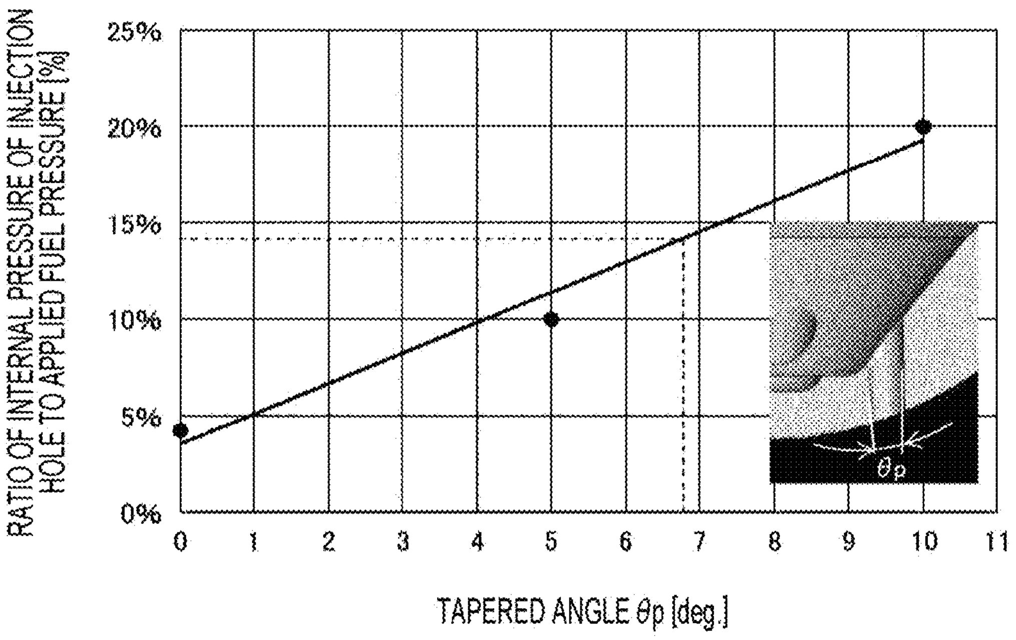
FIG. 17 is a diagram illustrating a relation between a tapered angle and the ratio of the internal pressure of the injection hole 107 to the applied fuel pressure.

FIG. 17 is a diagram illustrating the relation between the taper angle and the ratio of the internal pressure of the injection hole 107 to the applied fuel pressure. As illustrated in FIG. 17, in order to set the average value of the fuel pressure in the injection hole 107 (spatial volume) 107J to be equal to or more than 14% with respect to the fuel pressure on the upstream side of the seat portion 113, it is preferable that the tapered angle θp of the injection hole 107 is equal to or larger than 6.8 deg.

The fuel injection valve in the present embodiment described above has the following features.

(1) The fuel injection valve 101 includes the seat portion 113 on which the valve body 108 abuts, the injection hole 107 having an inlet opening 107G on the downstream side of the seat portion 113, and the injection-hole forming member 112 in which the inlet opening 107G is formed. The injection hole 107 has the inner peripheral surface 107F extending from the inlet side to the outlet side and the curved surface portion 107E formed between the peripheral edge 107I of the inlet opening 107G and the inner peripheral surface 107F. The inner peripheral surface 107F of the injection hole 107, the peripheral edge 107I of the inlet opening 107G, and the injection-hole center axis 107*a* being the center axis of the injection hole 107 have the following configuration on the plan view of being projected onto the virtual plane IP perpendicular to the injection-hole center axis 107*a*.

The curved surface portion 107E has a center-side curved surface portion 107AE and an outer-peripheral-side curved surface portion 107BE. The center-side curved surface portion 107AE is a curved surface portion formed on the inner side of the center-side peripheral edge portion 107A in the radial direction about the injection-valve center axis 101*a* being the center axis of the fuel injection valve 101, in the peripheral edges 107I of the inlet opening 107G. The outer-peripheral-side curved surface portion 107BE is a curved surface portion formed on the inner side of the outer-peripheral-side peripheral edge portion 107B in the radial direction about the injection-valve center axis 101*a* in the peripheral edge of the inlet opening 107G. The width W107AE of the center-side curved surface portion 107AE is larger than the width W107BE of the outer-peripheral-side curved surface portion 107BE.

(2) The fuel injection valve 101 includes the seat portion 113 on which the valve body 108 abuts, the injection hole 107 having an inlet opening 107G on the downstream side of the seat portion 113, and the injection-hole forming member 112 in which the inlet opening 107G is formed. The injection hole 107 has the inner peripheral surface 107F extending from the inlet side to the outlet side and the curved surface portion 107E formed between the peripheral edge 107I of the inlet opening 107G and the inner peripheral surface 107F. The injection hole 107 has the following configuration in a cross section that includes the injection-hole center axis 107*a* being the center axis of the injection hole 107, and passes through the center-side peripheral edge portion 107A and the outer-peripheral-side peripheral edge portion 107B in the radial direction about the injection-valve center axis 101*a* being the center axis of the fuel injection valve 101, in the peripheral edge 107I of the inlet opening 107G.

The curved surface portion 107E has the center-side curved surface portion 107AE formed on the inner side of the center-side peripheral edge portion 107A and the outer-peripheral-side curved surface portion 107BE formed on the inner side of the outer-peripheral-side peripheral edge portion 107B. Further, the curved surface portion 107E is configured so that the area 107SA of the portion surrounded by the center-side curved surface portion 107AE, the extension line 107FAb of the inner peripheral surface portion 107FA connected to the center-side curved surface portion 107AE in the inner peripheral surface 107F, and the straight line 107ABL connecting the center-side peripheral edge portion 107A and the outer-peripheral-side peripheral edge portion 107B is larger than the area 107SB of the portion surrounded by the outer-peripheral-side curved surface portion 107BE, the extension line 107FBb of the inner peripheral surface portion 107FB connected to the outer-peripheral-side curved surface portion 107BE in the inner peripheral surface 107F, the straight line 107ABL connecting the center-side peripheral edge portion 107A and the outer-peripheral-side peripheral edge portion 107B.

(3) The fuel injection valve 101 includes the seat portion 113 on which the valve body 108 abuts, the injection hole 107 having an inlet opening 107G on the downstream side of the seat portion 113, and the injection-hole forming member 112 in which the inlet opening 107G is formed. The injection hole 107 has the inner peripheral surface 107F extending from the inlet side to the outlet side and the curved surface portion 107E formed between the peripheral edge 107I of the inlet opening 107G and the inner peripheral surface 107F. The injection hole 107 has the following configuration in a cross section that includes the injection-hole center axis 107*a* being the center axis of the injection hole 107, and passes through the center-side peripheral edge portion 107A and the outer-peripheral-side peripheral edge portion 107B in the radial direction about the injection-valve center axis 101*a* being the center axis of the fuel injection valve 101, in the peripheral edge 107I of the inlet opening 107G.

The curved surface portion 107E has the center-side curved surface portion 107AE formed on the inner side of the center-side peripheral edge portion 107A and the outer-peripheral-side curved surface portion 107BE formed on the inner side of the outer-peripheral-side peripheral edge portion 107B. Further, the curved surface portion 107E is configured so that the length of the curve connecting the center-side peripheral edge portion 107A and the upstream end portion 107FAa of the inner peripheral surface portion 107FA connected to the center-side curved surface portion 107AE of the inner peripheral surface 107F is longer than the length of the curve connecting the outer-peripheral-side peripheral edge portion 107B and the upstream end portion 107FBa of the inner peripheral surface portion 107FB connected to the outer-peripheral-side curved surface portion 107BE of the inner peripheral surface 107F.

(4) The curved surface portion 107E formed between the peripheral edge 107I of the inlet opening 107G and the inner peripheral surface 107F may form an arc shape having a curvature, and the curvature radius of the center-side curved surface portion 107AE may be equal to or more than 0.023 mm.

(5) The curved surface portion 107E formed between the peripheral edge 107I of the inlet opening 107G and the inner peripheral surface 107F may form an arc shape having a curvature, and the curvature radius of the center-side curved surface portion 107AE may be formed to be larger than the curvature radius of the outer-peripheral-side curved surface portion 107BE.

(6) A plurality of injection holes 107 in which at least one injection hole is configured with the injection hole 107 described in (1) to (3) may be provided. The injection hole 107 described in (1) to (3) may be configured so that the average value of the pressure in the injection hole is equal to or more than 14% with respect to the pressure of fuel on the upstream side of the seat portion 113.

(7) A plurality of injection holes 107 in which at least one injection hole is configured with the injection hole 107 described in (1) to (3) maybe provided. In the entire region from the inlet opening surface 107G of the plurality of injection holes 107 to the seat portion 3 in the radial direction about the injection-valve center axis 101*a*, the cross-sectional area Ss of the fuel flow path formed in the peripheral direction about the injection-valve center axis 101*a* may be configured to be larger than the total area of the inlet openings 107G of all the injection holes 107.

(8) The injection hole 107 may be configured to have a tapered shape in which the cross-sectional area of the inner peripheral surface 107F extending from the inlet side to the outlet side, which is perpendicular to the injection-hole center axis 107*a*, decreases from the inlet side to the outlet side.

(9) The tapered angle forming the taper shape may be equal to or larger than 6.8 deg.

(10) A plurality of injection holes may be provided. In this case, all of the plurality of injection holes 107 may be configured with the injection hole 207 described in (1).

(11) All of the plurality of injection holes 107 described in (10) may be configured to have a tapered shape in which the cross-sectional area of the inner peripheral surface extending from the inlet side to the outlet side, which is perpendicular to the injection-hole center axis 107*a*, decreases from the inlet side to the outlet side.

(12) The injection-hole center axis 107*a* may be an axis passing through the center of the inner peripheral surface 107F of the injection hole 107. The center-side peripheral edge portion 107A and the outer-peripheral-side peripheral edge portion 107B may be located on the plane that is parallel to the injection-hole center axis 107*a* and passes through the injection-hole center axis 107*a*.

(13) The curved surface portion 107E may have the peripheral-direction curved surface portions 107CE and 107DE on the inner side of the peripheral-direction peripheral edge portions 107C and 107D, between the center-side peripheral edge portion 107A and the outer-peripheral-side peripheral edge portion 107B. On the plan view described in (1), the width W107AE of the center-side curved surface portion 107AE may be configured to be larger than the widths W107CE and 107DE of the peripheral-direction curved surface portions 107CE and 107DE.

(14) The curved surface portion 107E may be formed on the entire periphery of the inlet opening 107G.

REFERENCE SIGNS LIST

101 fuel injection valve
107 injection hole
107*a* injection-hole center axis
107A center-side peripheral edge portion
107ABL straight line connecting center-side peripheral edge portion 107A and outer-peripheral-side peripheral edge portion 107B
107AE center-side curved surface portion
107B outer-peripheral-side peripheral edge portion
107BE outer-peripheral-side curved surface portion
107E curved surface portion
107F inner peripheral surface of injection hole 107
107FA center-side inner peripheral surface portion connected to center-side curved surface portion 107AE
107FAa upstream end portion of inner peripheral surface portion 107FA
107FAb extension line of inner peripheral surface portion 107FA
107FB outer-peripheral-side inner peripheral surface portion connected to outer-peripheral-side curved surface portion 107BE
107FBa upstream end portion of inner peripheral surface portion 107FB
107FBb extension line of inner peripheral surface portion 107FB
107G inlet opening of injection hole 107
107I peripheral edge of inlet opening 107G
107SA, 107SB area on cross section
108 valve body
112 injection-hole forming member
113 seat portion
W107AE width of center-side curved surface portion 107AE
W107BE width of outer-peripheral-side curved surface portion 107BE

The invention claimed is:

1. A fuel injection valve comprising:
a seat portion on which a valve body abuts;
a plurality of injection holes having an inlet opening on a downstream side of the seat portion; and
an injection-hole forming member in which the inlet opening is formed,
wherein the plurality of injection holes has an inner peripheral surface extending from an inlet side to an outlet side and a curved surface portion formed between a peripheral edge of the inlet opening and the inner peripheral surface,
on a plan view obtained by projecting the inner peripheral surface of the injection hole, the peripheral edge of the inlet opening, and an injection-hole center axis being a center axis of the injection hole, onto a virtual plane perpendicular to the injection-hole center axis,
the curved surface portion has a center-side curved surface portion and an outer-peripheral-side curved surface portion,
the center-side curved surface portion is a curved surface portion formed on an inner side of a center-side peripheral edge portion in a radial direction about an injection-valve center axis being a center axis of the fuel injection valve, in the peripheral edge of the inlet opening, and
the outer-peripheral-side curved surface portion is a curved surface portion formed on an inner side of an outer-peripheral-side peripheral edge portion in the radial direction about the injection-valve center axis, in the peripheral edge of the inlet opening, and
a width at the center-side curved surface portion is configured to be larger than a width at the outer peripheral-side curved surface portion,
the plurality of injection holes includes two injection holes having different inclination angles with respect to the central axis of the injection valve,
among the two injection holes, the injection hole having a large inclination angle with respect to the central axis of the injection valve is configured such that a width of the center-side curved surface portion is larger than a width of the center-side curved surface portion of the injection hole having a small inclination angle, and
wherein fuel injection valve is structurally configured so that multiple fuel flows interfere with and add each other to flow along the inner peripheral surface of the plurality of injection holes, so as to not cause flow separation, and to cause fuel to flow into the plurality of injection holes.

2. The fuel injection valve according to claim 1, wherein the curved surface portion formed between a peripheral edge of the inlet opening and the inner peripheral surface forms an arc shape having a curvature, and the center-side curved surface portion is formed to have a curvature radius that is equal to or more than 0.02 mm.

3. The fuel injection valve according to claim 1, wherein the curved surface portion formed between the peripheral edge of the inlet opening and the inner peripheral surface forms an arc shape having a curvature, and the center-side curved surface portion is formed to have a curvature radius that is larger than a curvature radius of the outer-peripheral-side curved surface portion.

4. The fuel injection valve according to claim 1, the valve comprising:

the plurality of injection holes are configured so that an average value of pressure of at least one injection hole with respect to pressure of a fuel on an upstream side of the seat portion is equal to or more than 14%.

5. The fuel injection valve according to claim 1, the valve comprising:

wherein in an entire region from inlet openings of the plurality of injection holes to the seat portion in the radial direction about the injection-valve center axis, a cross-sectional area of a fuel flow path formed in a peripheral direction about the injection-valve center axis is larger than the total area of the inlet openings of the plurality of injection holes.

6. The fuel injection valve according to claim 1, wherein at least one of the plurality of injection holes is formed in a tapered shape in which an area of a cross section perpendicular to the injection-hole center axis in the inner peripheral surface extending from the inlet side to the outlet side is reduced from the inlet side toward the outlet side.

7. The fuel injection valve according to claim 6, wherein a tapered angle forming the tapered shape is equal to or larger than 6.8 deg.

8. The fuel injection valve according to claim 1, wherein the injection-hole center axis is an axis passing through a center of the inner peripheral surface of the injection hole, and the center-side peripheral edge portion and the outer-peripheral-side peripheral edge portion are located on a plane that passes through the injection-hole center axis.

9. The fuel injection valve according to claim 1, wherein the curved surface portion has a peripheral-direction curved surface portion on an inner side of a peripheral-direction peripheral edge portion between the center-side peripheral edge portion and the outer-peripheral-side peripheral edge portion, and on the plan view, the width at the center-side curved surface portion is configured to be larger than a width at the peripheral-direction curved surface portion.

10. The fuel injection valve according to claim 1, wherein the curved surface portion is formed over an entire periphery of the inlet opening.

11. A fuel injection valve comprising:

a seat portion on which a valve body abuts;

a plurality of injection holes having an inlet opening on a downstream side of the seat portion; and an injection-hole forming member in which the inlet opening is formed, wherein the plurality of injection holes has an inner peripheral surface extending from an inlet side to an outlet side and a curved surface portion formed between a peripheral edge of the inlet opening and the inner peripheral surface, in a cross section that includes an injection-hole center axis being a center axis of the injection hole and pass through a center-side peripheral edge portion and an outer-peripheral-side peripheral edge portion in a radial direction about an injection-valve center axis being a center axis of the injection valve, in the peripheral edge of the inlet opening, the curved surface portion has a center-side curved surface portion formed on an inner side of the center-side peripheral edge portion and an outer-peripheral-side curved surface portion formed on an inner side of the outer-peripheral-side peripheral edge portion, and the curved surface portion is configured so that a first area of a portion surrounded by the center-side curved surface portion, an extension line of an inner peripheral surface portion connected to the center-side curved surface portion in the inner peripheral surface, and a straight line connecting the center-side peripheral edge portion and the outer-peripheral-side peripheral edge portion is larger than second area of a portion surrounded by the outer-peripheral-side curved surface portion, an extension line of an inner peripheral surface portion connected to the outer-peripheral-side curved surface portion in the inner peripheral surface, and the straight line connecting the center-side peripheral edge portion and the outer-peripheral-side peripheral edge portion, the plurality of injection holes includes two injection holes having different inclination angles with respect to the central axis of the injection valve, among the two injection holes, the injection hole having a large inclination angle with respect to the central axis of the injection valve is configured such that the first area is larger than the first area of the injection hole having a small inclination angle, and wherein fuel injection valve is structurally configured so that multiple fuel flows interfere with and add each other to flow along the inner peripheral surface of the plurality of injection holes, so as to not cause flow separation, and to cause fuel to flow into the plurality of injection holes.

12. A fuel injection valve comprising:

a seat portion on which a valve body abuts;

a plurality of injection holes having an inlet opening on a downstream side of the seat portion; and an injection-hole forming member in which the inlet opening is formed, wherein the plurality of injection holes has an inner peripheral surface extending from an inlet side to an outlet side and a curved surface portion formed between a peripheral edge of the inlet opening and the inner peripheral surface, in a cross section that includes an injection-hole center axis being a center axis of the injection hole and pass through a center-side peripheral edge portion and an outer-peripheral-side peripheral edge portion in a radial direction about an injection-valve center axis being a center axis of the fuel injection valve, in the peripheral edge of the inlet opening, the curved surface portion has a center-side curved surface portion formed on an inner side of the center-side peripheral edge portion and an outer peripheral-side curved surface portion formed on an inner side of the outer-peripheral-side peripheral edge portion, and the curved surface portion is configured so that a first length of a curve connecting the center-side peripheral edge portion and an upstream side end portion of an inner peripheral surface portion connected to the center-side curved surface portion in the inner peripheral surface is longer than a second length of a curve connecting the outer-peripheral-side peripheral edge portion and an upstream side end portion of an inner peripheral surface portion connected to the outer-peripheral-side curved surface portion in the inner peripheral surface, the plurality of injection holes includes two injection holes having different inclination angles with respect to the central axis of the injection valve, among the two injection holes, the injection hole having a large inclination angle with respect to the central axis of the injection valve is configured such that the first length is larger than the first length of the injection hole having a small inclination angle, and wherein fuel injection valve is structurally configured so that multiple fuel flows interfere with and add each other to flow along the inner peripheral surface of the plurality of injection holes, so as to not cause flow separation, and to cause fuel to flow into the plurality of injection holes.

* * * * *